United States Patent
Motoshima et al.

(10) Patent No.: US 6,271,806 B1
(45) Date of Patent: Aug. 7, 2001

(54) DISPLAY SYSTEM

(75) Inventors: Takahiko Motoshima; Masayuki Kusano; Tadahiro Kimura; Shinsuke Nishida, all of Tokyo (JP)

(73) Assignees: Daichu Denshi Co., Ltd.; Fourie, Inc., both of Tokyo (JP)

( * ) Notice: Subject to any disclaimer, the term of this patent is extended or adjusted under 35 U.S.C. 154(b) by 0 days.

(21) Appl. No.: 09/174,119

(22) Filed: Oct. 19, 1998

(30) Foreign Application Priority Data

Oct. 22, 1997 (JP) .................................................. 9-290162

(51) Int. Cl.$^7$ ............................................... G09G 5/00
(52) U.S. Cl. .................................... 345/1; 345/903
(58) Field of Search .................................. 345/103, 903, 345/204, 1

(56) References Cited

U.S. PATENT DOCUMENTS

| | | | | |
|---|---|---|---|---|
| 4,771,278 | * | 9/1988 | Pooley | 345/903 |
| 4,833,542 | * | 5/1989 | Hara et al. | 345/903 |
| 5,067,021 | * | 11/1991 | Brody | 345/903 |
| 5,079,636 | * | 1/1992 | Brody | 345/903 |
| 5,128,662 | * | 7/1992 | Failla | 345/903 |

\* cited by examiner

*Primary Examiner*—Richard Hjerpe
*Assistant Examiner*—Kimnhung Nguyen
(74) *Attorney, Agent, or Firm*—Sughrue, Mion, Zinn, Macpeak & Seas, PLLC

(57) ABSTRACT

A display system is realized by setting virtual units on a screen display section constructed with nine display units and repeatedly splitting the screen into four portions, allocating virtual addresses each expressed with a binary value for each split level to each split unit of the screen (area). Thus, by setting the virtual units, the screen can be split into two portions (into four portions on the whole) even if there are physically only three display units along one side of the screen. For this reason, even when the screen is repeatedly split into four portions and each address is set to each of the split units to display an image, the image is not trimmed of any part thereof.

7 Claims, 27 Drawing Sheets

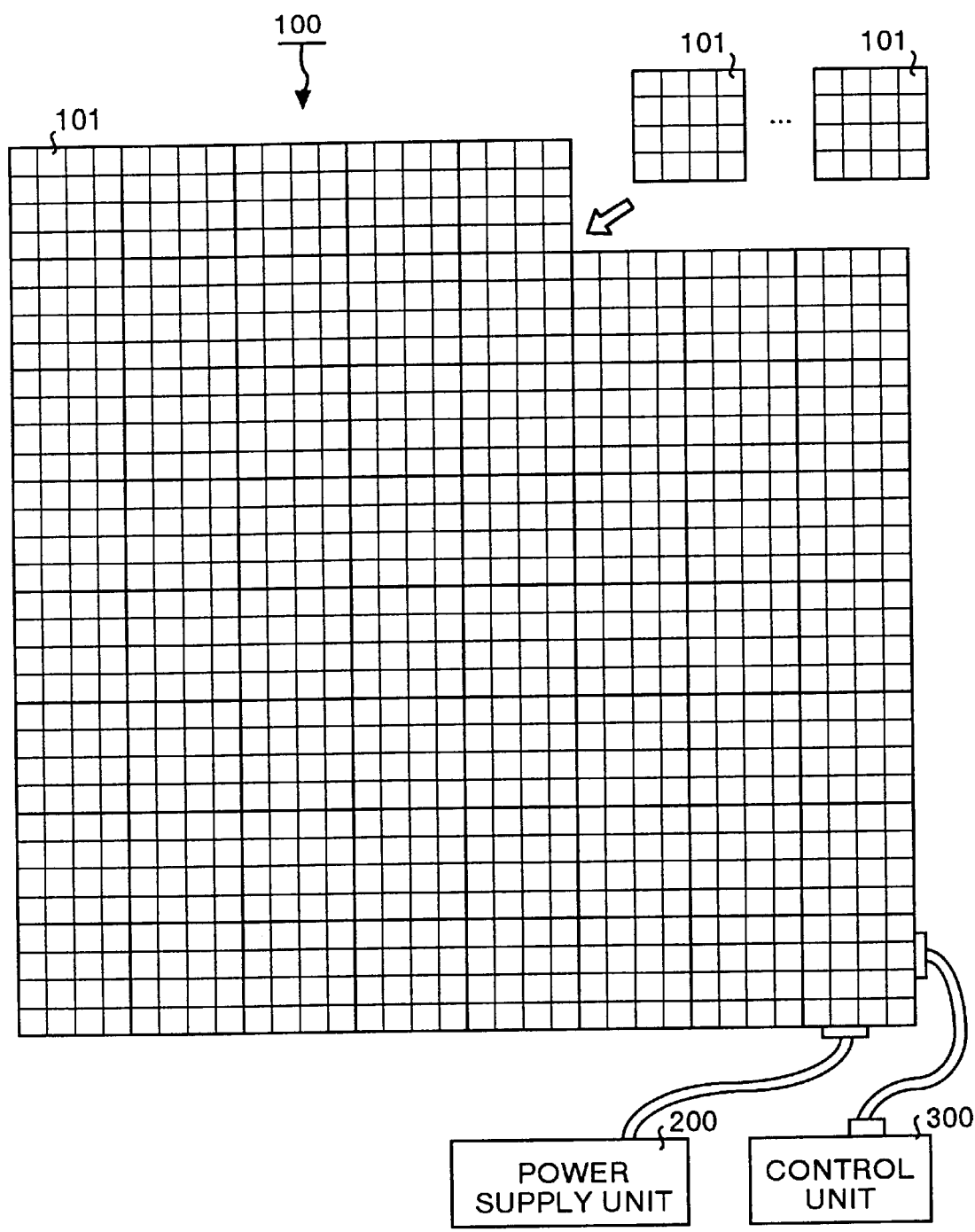

INFRARED PORT OF UPPER SIDE

INFRARED PORT OF LEFT SIDE

INFRARED PORT OF RIGHT SIDE

INFRARED PORT OF LOWER SIDE

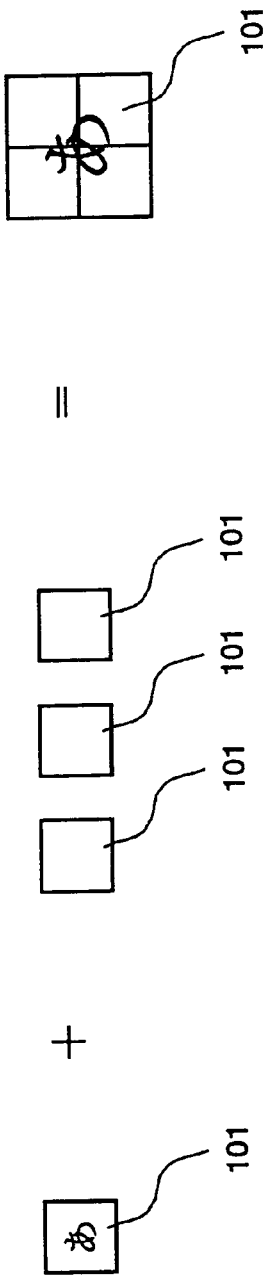
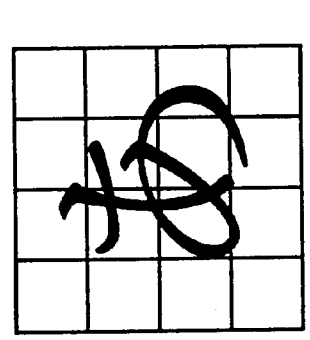
FIG.5A
FIG.5B

TRIMMED IMAGE

| | NUMBER OF DIVIDING TIMES | AREA ADDRESS | NUMBER OF BITS REQUIRED FOR ADDRESS ($2n$) | DISPLAY RESOLUTION ($2^{2n}$) |
|---|---|---|---|---|
| FIG.8A | $n=0$ | | 0 | 1 |
| FIG.8B | $n=1$ | a⌐ 00 \| 01 ⌐b<br>c⌐ 10 \| 11 ⌐d | 2 | 4 |
| FIG.8C | $n=2$ | e f<br>g⌐0000\|0001\|0100\|0101<br>h⌐0010\|0011\|0110\|0111<br>1000\|1001\|1100\|1101<br>1010\|1011\|1110\|1111 | 4 | 16 |
| FIG.8D | $n=3$ | 000000 010000 010101 ... i<br>100000 ... 110000<br>101010 111111 | 6 | 64 |

DATA STRUCTURE OF DISPLAY SIGNAL

FIG.10

| NUMBER OF DIVIDING TIMES | DISPLAY RESOLUTION INFORMATION | BIT LENGTH OF DISPLAY ADDRESS INFORMATION | DISPLAY RESOLUTION ($2^{2n}$) |
|---|---|---|---|
| 0 | 0 0 0 0 | 0-BIT | 1 |
| 1 | 0 0 0 1 | 2-BIT | 4 |
| 2 | 0 0 1 0 | 4-BIT | 16 |
| 3 | 0 0 1 1 | 6-BIT | 64 |
| 4 | 0 1 0 0 | 8-BIT | 256 |
| ⋮ | ⋮ | ⋮ | |
| 15 | 1 1 1 1 | 30-BIT | 1G |

FIG.18

| A NUMBER OF SPLIT TIMES | DISPLAY RESOLUTION INFORMATION | BIT LENGTH OF DISPLAY ADDRESS INFORMATION | DISPLAY RESOLUTION ($2^{2n}$) |
|---|---|---|---|
| 0 | 0 0 0 0 | 0 BIT | 1 |
| 1 | 0 0 0 1 | 2 BIT | 4 |
| 2 | 0 0 1 0 | 4 BIT | 16 |
| 3 | 0 0 1 1 | 6 BIT | 64 |
| 4 | 0 1 0 0 | 8 BIT | 256 |
| ⋮ | ⋮ | ⋮ | |
| 15 | 1 1 1 1 | 30 BIT | 1 G |

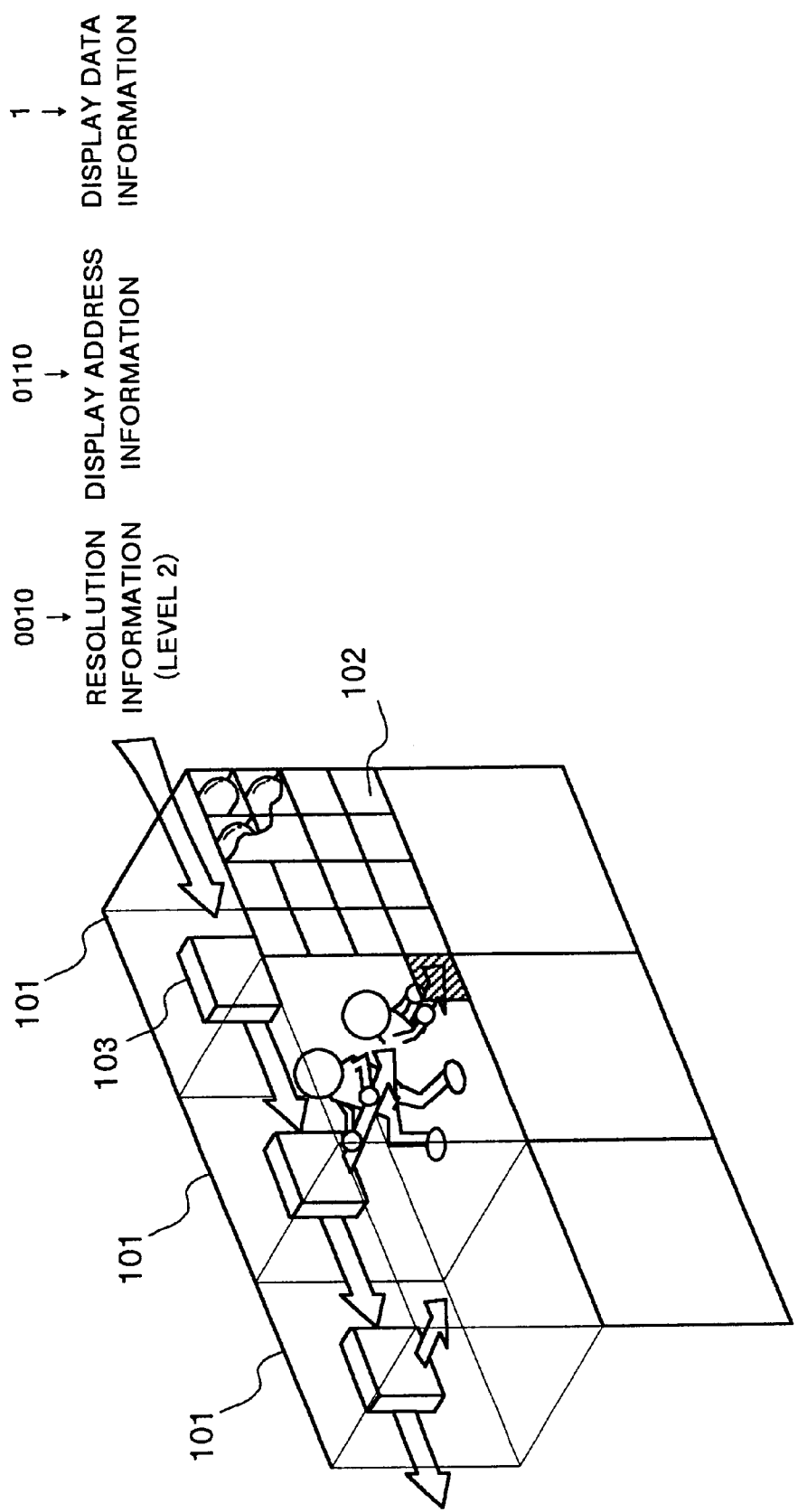

FIG.24A

| 00 | 01 |
|----|----|
| 10 | 11 |

FIG.24B

| $00_{00}$ | $00_{01}$ | 01 |
| $00_{10}$ | $00_{11}$ |    |
| 10        |           | 11 |

DISPLAY SYSTEM

FIELD OF THE INVENTION

The present invention relates to a display system which can be constructed by connecting a plurality of display elements to each other and more particularly, to a display system which can display an entire image regardless of a number of display elements.

BACKGROUND OF THE INVENTION

In recent years, a display unit such as a television, a monitor or a display of a computer has been progressing for upsizing and higher resolution. In addition, a main stay of display units has shifted from a CRT to a liquid crystal display unit or a plasma display unit, so that display units are becoming increasingly thinner.

Especially, with a progress in the multimedia technology, a display unit is increasingly becoming an important and indispensable item when accessing a cyber space, and a larger size of screen with higher resolution is strongly desired.

In addition, a display unit is used in various occasions and it is required that the display unit is portable, and for this reason there is desired a display unit that is compact in size when carried, and has a large-sized screen with high resolution when assembled, and a display unit of which screen can be assembled in an arbitrary size as required.

However, with the conventional type of display unit, although upsizing and high resolution thereof have been in progress, excluding a large-sized display unit provided as a facility in a building such as an electric bulletin board or a sky sign, entire screen of the display unit is generally manufactured as a single unit at the time of manufacturing, so that there are problems as described below.

First, a user can not freely change or select size of the screen of a display unit.

Second, when a user wants to set a display unit with a large-sized screen, a display unit with a screen which is larger than the size of an entrance to a room can not be carried into the room, so that the display unit is practically restricted by size of the entrance thereof.

Third, the display unit with a large-sized screen is inconvenient to carry.

In addition, an image transmitting system in the conventional type of display unit works based on a scanning line system for continuously transmitting image data at prespecified resolution and a number of scanning lines, and can not basically support cases where the resolution (a number of display elements in the horizontal direction) and a number of scanning lines (a number of display elements in the vertical direction) are changed in association with a change in the size of the screen, and for this reason, the manufacturers could hardly think of any idea for making it possible for a user to freely change size of a screen.

For example, even if the resolution (a number of display elements in the horizontal direction) and the number of scanning lines (a number of display elements in the vertical direction) are increased by making the size of the screen larger, the resolution and the number of scanning lines each constituting the image data transmitted in the scanning line system remain unchanged, so that it is impossible to display an image using the entire screen. If an image is to be displayed, a portion of the screen is used for displaying the image thereon according to resolution and a number of scanning lines of transmitted image data. In other words, it is impossible to increase resolution of an image displayed on the screen even if the size of the screen is made larger.

If the resolution (a number of display elements in the horizontal direction) and the number of scanning lines (a number of display elements in the vertical direction) are decreased by making the size of the screen smaller, the resolution and the number of scanning lines each constituting the image data transmitted in the scanning line system is still the same as the original ones, so that all the transmitted image data can not be displayed on the screen. In other words, any display unit with a smaller screen results in displaying thereon only a portion of the image (an image trimmed according to the size of a screen) displayed on a display unit with a larger screen.

As a technology for solving the problems as described above, there is the patent application applied for by the present applicant (Japanese Patent Laid-Open No. HEI 9-144296). Description is made hereinafter for an outline of this invention, however, detailed description thereof will be made in embodiments. With this invention, it is possible to construct a display system 100 with an arbitrary size of screen, as shown in FIG. 20, by connecting a plurality of pieces of unitized display unit (display unit 101) to each other. With this type of configuration, size of a screen can arbitrarily be set, which allows a screen even with a larger size than that of an entrance of an office or a house to be realized inside the room thereof. In addition, the display system can be handled unit by unit, so that it is convenient to carry.

FIG. 21 is an explanatory view showing how the display system 100 shown in FIG. 20 is used. This display system 100 may be used, for example, by installing on the entire wall of the room (K in the figure), or by attaching onto a portion (Q in the figure) of the wall surface or the roof (not shown in figure) of the room. This display system 100 can be purchased by purchasing the display units, so that the most suited size can be set in consideration of size of a wall and a space inside a room. In addition, the size of a screen can freely be increased or reduced, and a plurality of images (a to d in the figure) can concurrently be displayed on the system.

Sound can be adjusted automatically according to how an image is to be displayed. For example, if an image appears on the right side of the wall surface, sound is outputted mainly from a speaker Sr on the right side. Volume of the sound is also adjusted according to the size of an image. For example, if the image is small, the sound becomes smaller in proportion to the size. If the image is large, the sound becomes larger in proportion to the size.

This invention is also characterized in that, the resolution becomes higher in association with magnification of an image. That is because, as shown in a section E of FIG. 22, each of display units 101 has a plurality of display elements 102 arranged in an array. Accordingly, as shown in the figure, if an image A is magnified four times to obtain an image B, and when the same image contents is to be displayed, the image B having a larger number of display elements has higher resolution. In contrast, in the image display unit based on the conventional type of scanning line system, even if the image is magnified, a number of scanning lines are not changed, so that there is no change in the resolution.

Next, description is made for configuration of a display unit. As shown in FIG. 23, each display unit 101 has, for example, sixteen (4×4) display elements 102. Each of the display units has a controller 103 respectively, and a storage device (not shown in the figure) is connected to the controller 103. Data communications between display units are performed with infrared rays. For this reason, only the operation of arranging the display units 101 is required, so that the need for physical connection therebetween is eliminated (Only connection for power supply is required). Namely, by sending image data to one of display units 101, the image data is transmitted to other display units 101. Therefore, there is no need of wiring for each display element like in the conventional type of display unit.

However, with the configuration as described above as it is, all of the image data flows straight to each of the display units 101, so that each of the display units 101 can not determine whether it should remain ON or OFF from the image data sent thereto. Therefore, in this display system 100, the controller 103 of each display unit 101 selects data corresponding to the display element itself among the image data flown up to the displays, and each display unit is turned ON or OFF according to contents of the selected image data.

The image data consists of resolution information, display address information and display data information. The resolution information is an information for splitting of an image. An image is split, for example, in 16 portions or 25,600 portions. It should be noted that a display element of a display unit is the minimum unit for split. The address information is an information for specifying one unit of split screen. For example, when the screen is split into four portions, four address information for specifying each of the split units are needed. Each of the split units in this invention is represented by a binary value. The display data information is an information for display of a split unit, for example, ON/OFF information for display elements belonging to one split unit.

The controller 103 incorporated in the display unit 101 selects image data related to the unit itself from all the image data. Then, display elements corresponding to address information included in the image data are lit up according to the image data.

Next, description is made for an example of image displayed on the display system 100 according to the present invention. At first, an address is set for each of split units (area) of the screen. The address is represented in a binary number. FIG. 24 is an explanatory view showing allocation of addresses. For example, when the screen is divided into four, addresses are set like "00", "01", "10", and "11". (FIG. 24A). When the screen is divided into sixteen, each of the split units obtained by splitting into four is further split into four. Therefore, when the split unit having the address "00" is further split into four, the address "00" remain in the first two digits of each new address, and the addresses "00", "01", "10", and "11" are allocated to the next two digits thereof, so that the addresses are finally set like "0000", "0001", "0010" and "0011" (FIG. 24B).

Similarly, when the split unit having the address "01" is further split into four, the address "01" remain in the first two digits of each new address, and the addresses "00", "01", "10", and "11" are allocated to the next two digits thereof, so that the addresses are finally set like "0100", "0101", "0110" and "0111". The similar operation is performed for dividing the screen into sixty-four.

As described above, setting of addresses is performed by repeating an image or a portion thereof into four portions. This address setting will be explained in detail once more in description of embodiments. A step of splitting the screen into four portions is referred to as "LEVEL 1", a step of splitting it into sixteen portions is referred to as "LEVEL 2", a step of splitting it into sixty four portions is referred to as "LEVEL 3", and a step of splitting it into n-th power of two portions is referred to as "LEVEL (n−1)".

More specifically, when the image A is displayed as shown in FIG. 25, at first, a display element corresponding to the LEVEL-1 address "00" is set to black. Then, display elements corresponding to the LEVEL-2 addresses "0000", "0011" are set to white, and display elements corresponding to the LEVEL-3 addresses "000000", "001111" are set to black. However, it is not known, only by setting the addresses as described above, which level of image should be treated preferentially, so that it is previously decided that "the image having a higher level is to be preferential". FIG. 26A shows the image obtained as described above. It should be noted that the same image can be obtained also when the display elements corresponding to the LEVEL-2 addresses "0001", "0010" are set to black, and the display elements corresponding to the LEVEL-3 addresses "000000", "001111" are set to black. Namely, a number of combinations to obtain one of image are not necessarily limited to one.

Next, consideration is made for a case where this image is changed as shown in FIG. 26B. In this case, the LEVEL-3 addresses "000000", "001111" maybe changed to "000011", "001100". The image data at LEVEL-1 and LEVEL-2 remain the same. In the conventional technology, when an image is to be changed, data for the entire image is required to be sent, but in the present invention, an address for a portion to be changed may be specified and only the image data for the specified part may be sent. For this reason, amount of data to be processed is reduced, which allows the time for processing to be reduced. In addition, although a number of combinations in order to obtain an image are not necessarily one as described above, it is preferable to prepare an optimal combination in consideration of a change of the image later. That is because processing with fewer amounts of data for an image to be changed can be more efficient.

By the way, it is preferable in the display system 100 that a number of display units on the side of a screen is $2^n$ because addresses are set for each split unit (area) by repeatedly splitting an image or a portion thereof into four portions. It is also preferable that a number of display elements on the side of each display unit 101 is a power of two. That is because the number can be divided by 2 without a remainder.

Description is made for a particular example. When the size of the screen is magnified four times by adding display units 101 thereto as shown in FIG. 27A, the display units 101 become 4×4=16 pieces. Then, if the magnified screen is split into four and addresses are allocated thereto, an image four times larger than the original one can be obtained.

Then, as shown in FIG. 27B, if a screen display section consisting of 3×3=9 pieces of display units 101 is constructed, the entire screen can not be split into four portions. Therefore, addresses are allocated assuming that there are 16 pieces of display units 101 (indicated by dotted lines in the figure), and if the screen including virtual units 101' is split into four portions and addresses are allocated thereto, an image four times larger than the original one can be obtained. However, the image corresponding to the virtual unit portion placed thereon can not be displayed, so that the actually obtained image is a trimmed one.

SUMMARY OF THE INVENTION

It is an object of the present invention to provide, for solving the problems described above, a display system which can display an entire image regardless of a number of display units.

Other objects and features of this invention will become apparent from the following description with reference to the accompanying drawings.

The display system according to the present invention comprises a display device obtained by constructing a screen with a plurality of display units each in turn comprising display elements arranged in a matrix connected to each other, and a control unit. The control unit virtually repeats an operation of splitting the screen into four portions not necessarily by setting the display unit as a unit for splitting but setting the display element as a minimum unit for splitting, sets a virtual address for each split unit each time when the screen is split into four portions, and identifies this virtual address, gives display data to be displayed to a virtual unit having the corresponding virtual address, and displays an image on a part or all of the display unit. Because of this, an image is displayed without being trimmed of any part thereof. In addition, size of a screen can freely be set without requiring a particular number of display elements.

BRIEF DESCRIPTION OF THE DRAWINGS

FIG. 1 is a block diagram schematically showing a display system according to an embodiment of the present invention;

FIGS. 5A and 5B are explanatory views showing a relation between size of a screen and resolution when the size of the screen is magnified;

FIG. 8 is an explanatory view in a case of converting an address to any other address with a table;

FIG. 10 is an explanatory view showing an example of how the table is prepared;

FIG. 18 is an explanatory view showing a correlation among a number of split times, display resolution information, a bit length of display address information and display resolution;

FIG. 23 is an explanatory view schematically showing configuration of the display elements;

FIGS. 24A and 24B are explanatory views showing how to allocate addresses;

DESCRIPTION OF THE PREFERRED EMBODIMENTS

Figure 2A:
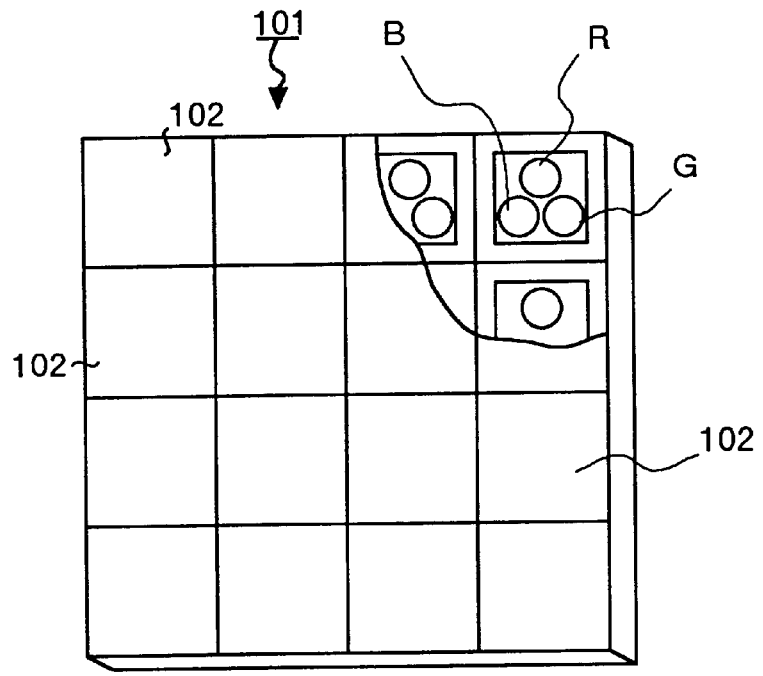
FIGS. 2A and 2B are block diagrams each schematically showing a display element shown in FIG. 1.

Detailed description is made hereinafter for the present invention with reference to the related drawings. It should be noted that the present invention is not limited to the embodiments.

FIG. 1 is a block diagram schematically showing a display system according to an embodiment of the present invention. This display system 100 comprises a screen display section 150 with plural display units 101 each having the same configuration connected to each other, a power unit 200 for supplying power to the screen display section 150, and a control unit 300 for supplying a display signal including information for display data indicating display address information and display contents to the screen display section 150. It should be noted that description herein assumes the power unit 200 as an independent device, but the display system 100 may directly be connected to an ordinary home-power supply unit (100 V). Power may be supplied to the display system 100 through the control unit 300.

Figure 2B:
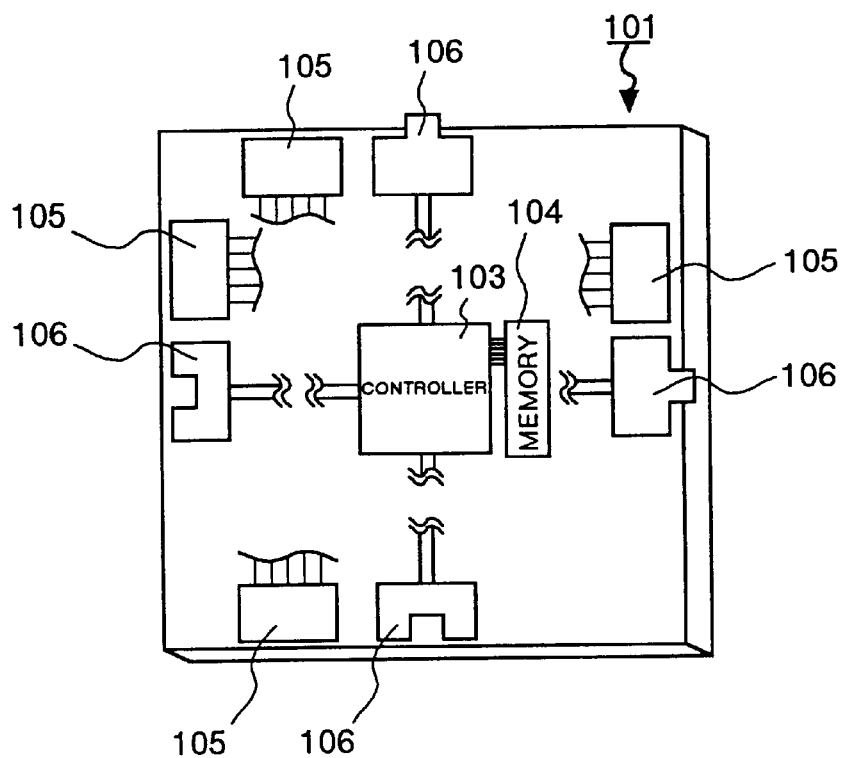

FIG. 2A and FIG. 2B each show a block diagram of a display unit 101 respectively. FIG. 2A shows topside of the display unit 101 while FIG. 2B shows rear side of the display unit 101. The display unit 101 has plural display elements 102 arranged in a matrix, a controller 103 for controlling a state of displaying of the display elements, a memory (storage section) 104 for storing therein address information for respective display element 102 in a screen constructed by connecting a plurality of display units 101 to each other, signal transmitting sections 105 for performing signal transaction between the controller 103 and the control unit 300 or other display elements 102, and power transmitting section 106 for supplying power to the display elements 102, controller 103, memory 104 and the signal transmitting sections 105 installed therein.

FIG. 1 and FIG. 2 are examples in which 4×4 (=16) display elements 102 are arranged to form one display unit 101 to simplify the description. However, the number of display elements is not limited to the above number, and in practice, a degree of integration of the display elements 102 may be enhanced as required. One display element 102 corresponds to one pixel, and three light-emitting diodes R, G, B are provided inside the display element 102, so that color display can be performed with the three colors of R (red), G (green) and B (blue).

Four power transmitting sections 106 are arranged at the central positions of the upper, lower, left and right sides of the display unit 101 respectively, so that, the power transmitting sections 106 of any adjacent display units 101 are electrically connected to each other when a plurality of display units 101 are connected to each other. Herein, the power transmitting section 106 on the right and on the upper side have a convex shape, while the power transmitting section 106 on the left and on the lower side have a concave shape. The convex and concave shaped power transmitting sections 106 are engaged with each other when the display units 101 are connected to each other. Accordingly, when the power transmitting section 106 of any one of the display units 101 among the plurality of display units 101 connected to each other is connected to the external power unit 200 (Refer to FIG. 1), power is supplied to other display units 101 through the display unit 101 connected to the external power unit 200.

Four signal transmitting sections 105 are arranged in the upper, lower, left and right sides of the display unit 101 respectively, so that, signal transaction can be performed between the signal transmitting sections 105 of any adjacent display units 101 when a plurality of display units 101 are connected to each other. It is assumed herein that the signal transmitting sections 105 are provided in positions displaced from the central positions of the display unit 101 respectively taking consideration into safety in a case where display units 101 are rotated and arranged therein.

The signal transmitting sections 105 comprises an infrared port (an infrared communicating unit), and the signal transmitting sections 105 execute signal transaction with each other two-directionally in a non-contact state.

Figure 3:
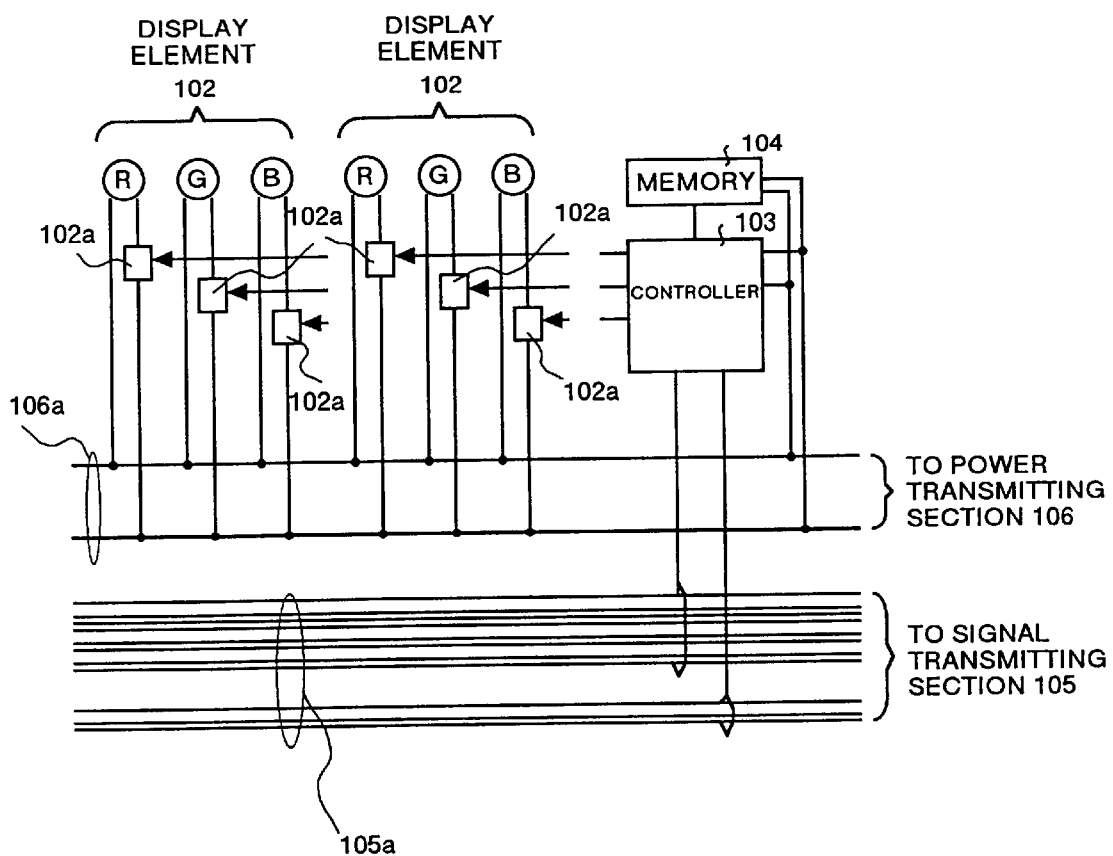
FIG. 3 is a wiring diagram inside the display element shown in FIG. 1.

FIG. 3 is a wiring diagram inside the display unit 101. A power line 106a from the power transmitting section 106 and a signal line 105a from the signal transmitting section 105 are wired inside thereof. Herein, the power line 106a is connected to the controller 103, memory 104, and each of the display elements 102, while the signal line 105a is connected to the controller 103.

The control elements 102a for controlling each state of displaying of each of the light-emitting diodes R, G and B are provided between the light-emitting diodes R, G and B constituting each of the display elements 102 and the power line 106a, and provide controls for power supply to the light-emitting diodes R, G and B according to a control signal from the controller 103 respectively.

It should be noted that the controller 103 performs, when a plurality of display units 101 are connected to each other, signal transaction with the controllers 103 of any other adjacent display units 101 through the signal transmitting sections 105, recognizes size of the screen obtained by connecting a plurality of display units 101 to each other as well as a position of the unit itself in the screen, generates each address information for each of the display elements 102 in the screen according to the position of the unit itself, and stores the information on the memory 104.

Method of Changing Screen Size and Resolution using Display Units

Figure 4A:
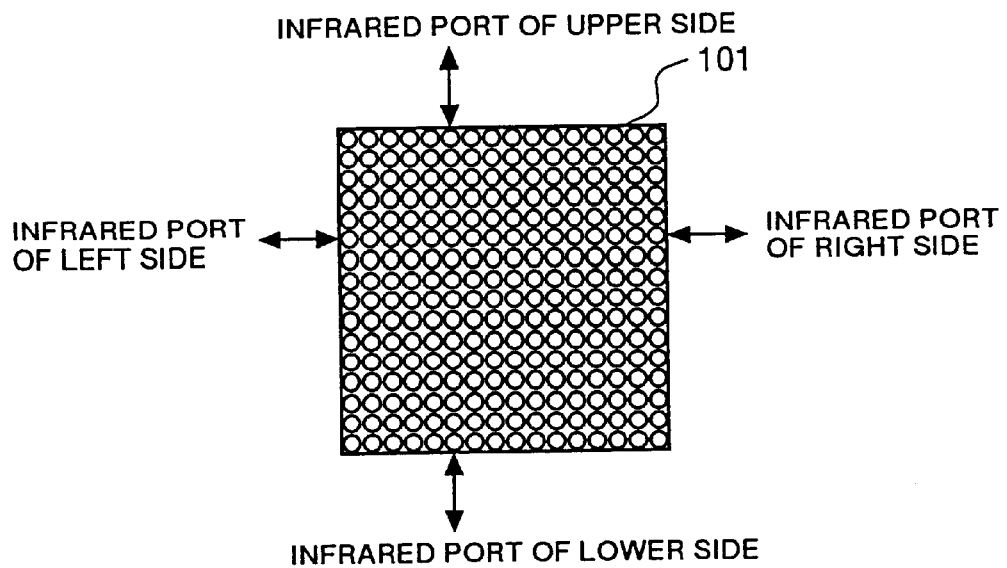
FIGS. 4A and 4B are explanatory views showing change in a screen size and resolution when four pieces of display element are used.
Figure 4B:
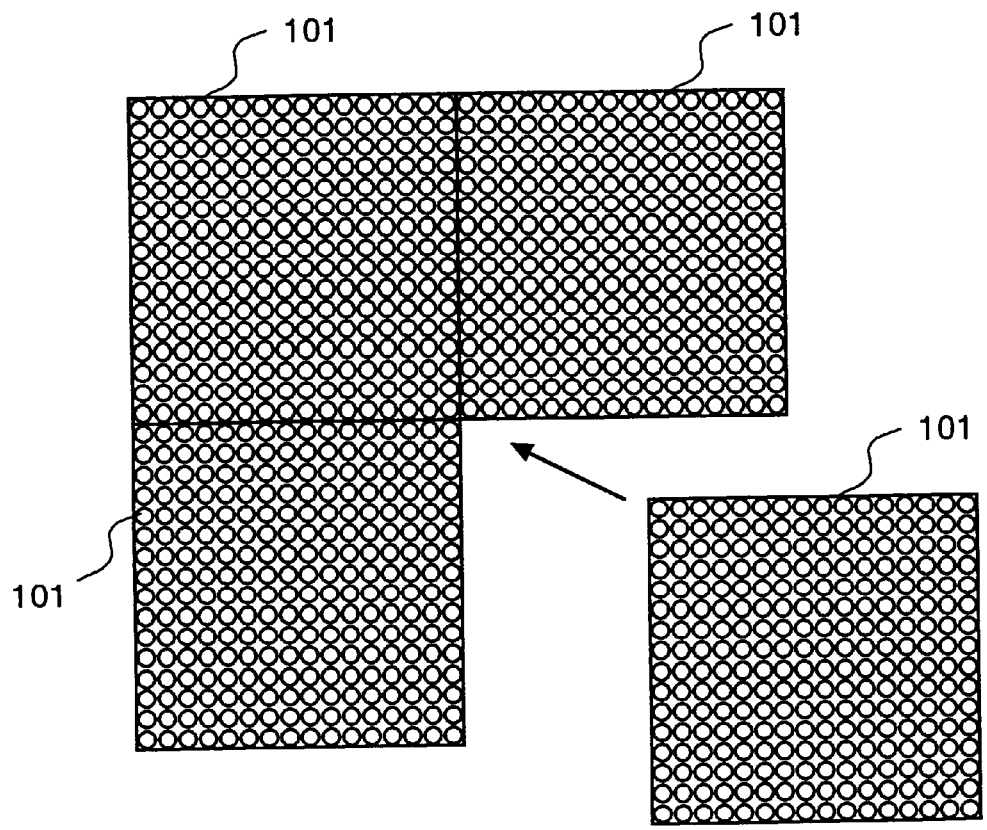

Description is made for an operation of changing screen size and resolution when four display units 101 are used with reference to FIG. 4A and FIG. 4B. If one display unit 101 has 256 display elements 102 as shown in FIG. 4A, an image can be displayed on a 256-dot (display element) screen by one display unit 101. It should be noted that a display element 102 corresponds to one light-emitting diode indicated by a circle in the figure.

In this display unit 101, four signal transmitting sections 105 (infrared ports) are arranged at positions displaced from the center line of the upper, lower, left and right sides of the display unit 101 respectively. Accordingly, there are upper, lower, left and right sides in the structure of the display unit 101. With this structure, the controller 103 can accurately recognize a position (namely coordinates) of each display element 102 on the display unit 101 at any time.

A user can easily assemble a screen, when a screen size is to be magnified with four pieces of this 256-dot display unit 101, only by engaging power transmitting sections 106 of adjacent display units 101 with each other carefully so that signal transmitting sections 105 of the display units 101 are placed in positions opposite to each other respectively. It should be noted that only connection of the power transmitting sections 106 of the display unit 101 is shown herein to simplify the description, but practically a frame is provided as required in consideration of connection strength between display units 101 and strength of the entire screen.

Only by arranging the signal transmitting sections 105 simply opposite to each other as described above, because of each of the sections comprises a two-directional infrared port, the assembly is easy because it does not require connection of signal lines between each display units 101, and therefore convenient.

All the display units 101 have the same configuration, which allows the display elements to be arranged freely. Accordingly, the display elements are interchangeable without causing any trouble, so that assembly thereof is quite easy.

With this display system 100, if the image (herein, a Japanese character "あ" pronounced "a") displayed on the screen display section 150 consisting of one display unit 101 is displayed on the screen display section 150 consisting of four display units 101 as shown in FIG. 5A, the image can be displayed on the screen with its size four times as large as that of the above screen and with resolution four times as high as that of the above screen. Similarly, as shown in FIG. 5B, the image can be displayed on the screen with its size 16 times as large as that of the above screen and with resolution 16 times as high as that of the above screen in the example of combining sixteen display units 101. It should be noted that, resolution and a number of scanning lines have been specified in image data transmitted in the conventional type of scanning system, and for this reason, even if the resolution (a number of display elements) is increased by making size of a screen larger, it is impossible to display the image at high resolution on the magnified screen.

Setting of Virtual Units

Figure 6C:
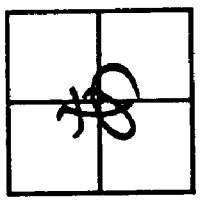
FIGS. 6A, 6B and 6C are explanatory views showing a state in which virtual units are set in a screen display section consisting of nine pieces of display element.
Figure 6B:
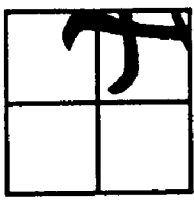
Figure 6A:
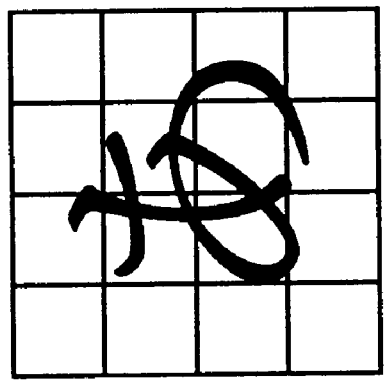

As shown in FIG. 5C, when the image is to be displayed on the screen display section 150 consisting of nine display units 101, the corresponding image is trimmed as described in the example based on the conventional technology. Therefore, in the present invention, a display of the entire image can be realized by setting virtual units 101V. Namely, virtual units 101V are set by splitting the entire image into four portions regardless of a physical number of display elements. It should be noted that, the reference numeral 101R indicates a real display unit and the reference numeral 101V indicates a virtual unit to simplify the description. Specifically, as shown in FIG. 6A, the screen consisting of nine display units 101R (indicated by a dotted line in the figure) is split into four portions and four virtual units 101V (indicated by a solid line in the figure) are set, and each of the split virtual units is further split into four portions to set 16 pieces of virtual units 101V as shown in FIG. 6B.

Figure 7A:
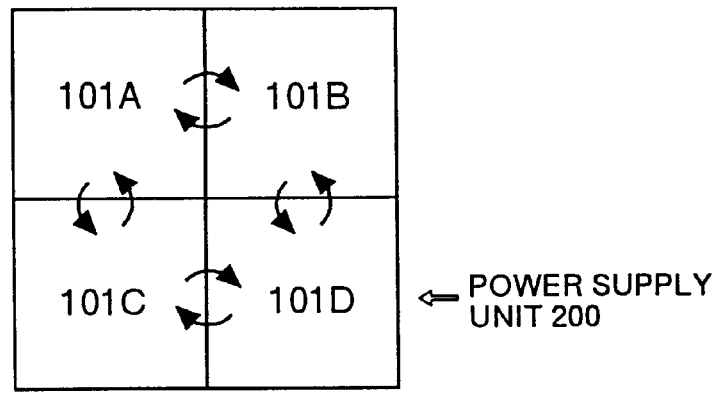
FIG. 7 is an explanatory view showing a state in which virtual units are set in a screen display section consisting of 144 pieces of display element.
Figure 7B:
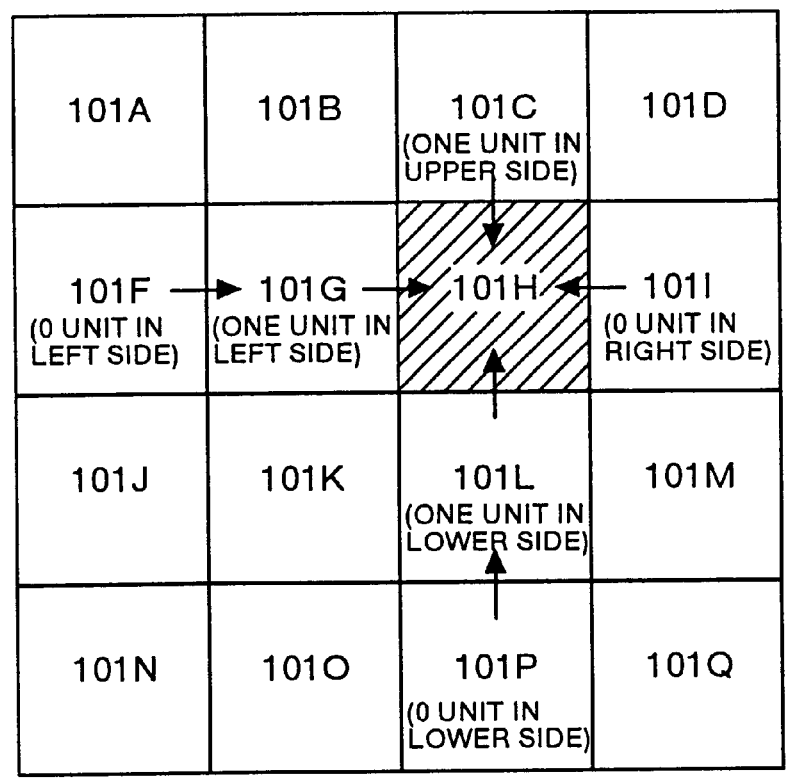

Although the description above has assumed the case where the screen consists of nine (3×3) display units 101R, as shown in FIG. 7, even when a screen display section 150 is constructed by connecting display units 101R to each other over the wall surface, the virtual units 101V can be set as described above. For example, even when the screen display section 150 is constructed by connecting 144 (12× 12) display units 101R to each other, virtual units 101V can be set. Namely, a four-splitting operation can be repeated twice on condition that 12 pieces of display units 101 are connected to each other on one side. However, the following split can not be performed in each actual display unit 101R because there are three pieces of display unit 101R left (nine pieces in total). For this reason, virtual units 101V are set and the screen is further split. Thus, when the number of display units 101R is not a power of two as described above, virtual units 101V need to be set. Virtual units 101V may also be set from the beginning regardless of a number of display units 101R.

Address Conversion between Display elements and Virtual Units

Next, address conversion between display units 101R and virtual units 101V is described with concrete examples. An address when a virtual unit is set will be referred to as a virtual address to simplify the description. Memory 104 of each display unit 101R stores therein converted addresses. The converted addresses may also be stored in the control unit 300 and signals after conversion may be sent to display units 101R.

(1) Address conversion with a table

Description is made for a case where a screen display section 150 is constructed by connecting nine display units 101R each having sixteen display elements along one side (total 256 elements) as shown in FIG. 8. It should be noted that, description is made herein referring to one of the sides (along which there are three pieces of display units 101R) of the screen display section 150 to simplify the description. Practically, the same processing is executed to the longitudinal and lateral sides of the screen.

As three pieces of display unit 101R each having sixteen of display elements along one side are connected to each other, a total number of display elements existing along one side of the screen display section 150 is 48 (=16×3). At first, addresses from "0" to "47" are allocated to the display elements from the left side to the right side, and an address table correlating to each of the display elements is prepared for each level. It should be noted that addresses allocated to each of the display elements are described serial addresses hereinafter.

Figure 9:
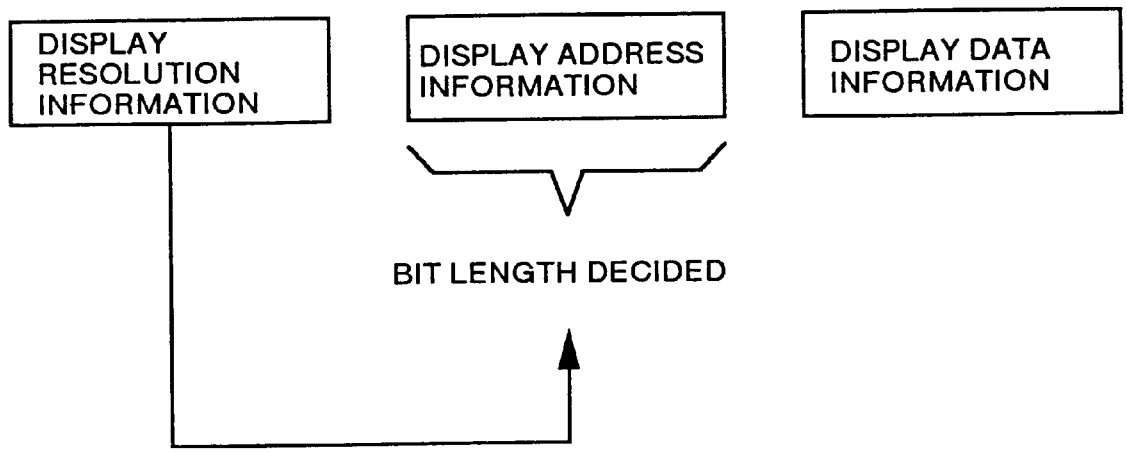
FIG. 9 is an explanatory view in a case of converting an address to any other address with a table.

Next, description is made for a display element A having a serial address of "27" as an example. At first, as shown in FIG. 8, the serial addresses "0" to "47" are split into two for splitting them into four in LEVEL 1 (splitting a side into two), so that the display element with the serial address of "24" comes at a head of the split unit. Therefore, if the serial address of the display element "A" is "24" or more, the address "1" is allocated thereto as a virtual address in LEVEL 1, and if the serial address of the display element "A" is less than "24", address "0" is allocated thereto as a virtual address in LEVEL 1. Herein, the display element "A" has a serial address of "27" which is more than "24", obviously, a virtual address "1" in LEVEL 1 (split into four) is allocated. Accordingly, as shown in FIG. 9, the address "1" is allocated to the display element "A" in the address table as the virtual address in LEVEL 1.

Then, as shown in FIG. 8, when the screen is split into sixteen at LEVEL 2 (split of one edge into four sections), the serial addresses "0" to "47" are split into four, each of the serial addresses "12", "24", and "36" comes at a head of each of the split units respectively. Therefore, the address "00" is allocated thereto as a virtual address in LEVEL 2 if the serial address of the display element "A"is less than "12", the address "01" as a virtual address if in a range from "12" or more to less than "24", the address "10" as a virtual address if in a range from "24" or more to less than "36", and the address "11" as a virtual address if "36" or more.

Herein, the serial address "27" of the display element "A" corresponds to the range from "24" or more to less than "36". Accordingly, the virtual address "10" in LEVEL 2 (split into 16) is allocated. As shown in FIG. 10, the address "10" is allocated to the display element "A" in the address table as the virtual address in LEVEL 2.

When addresses are split into 64 portions in LEVEL 3 (a side is split into eight), a virtual address is also allocated to the display element through the same operations. A virtual address allocated to each display element is compared to a serial address of a header display element within each split unit in each level as described above to determine which is larger in address, and a virtual address corresponding to the size of the address is allocated to each display element. Then, a virtual address table correlated to serial addresses of each display element (e.g., "A") is previously prepared.

(2) Address conversion by computing (Part 1)

A display area may also be obtained by the operation of "a number of split units×LEVEL". Description is made for a case where a screen display section 150 is constructed by connecting nine display units having sixteen display units on one side (256 elements in all) as shown in FIG. 11. It should be noted that the description is referred to one of the sides (three pieces of display units 101R) of the screen display section 150 to simplify the description. Practically, the same processing is executed to the longitudinal and lateral sides of the screen.

As three display units 101R each having sixteen elements on one side are connected to each other, total number of display elements on one side of the screen display section 150 is 48 (=16×3). At first, serial addresses from "0" to "47" are allocated to the display elements from left to right side.

Figure 11A:
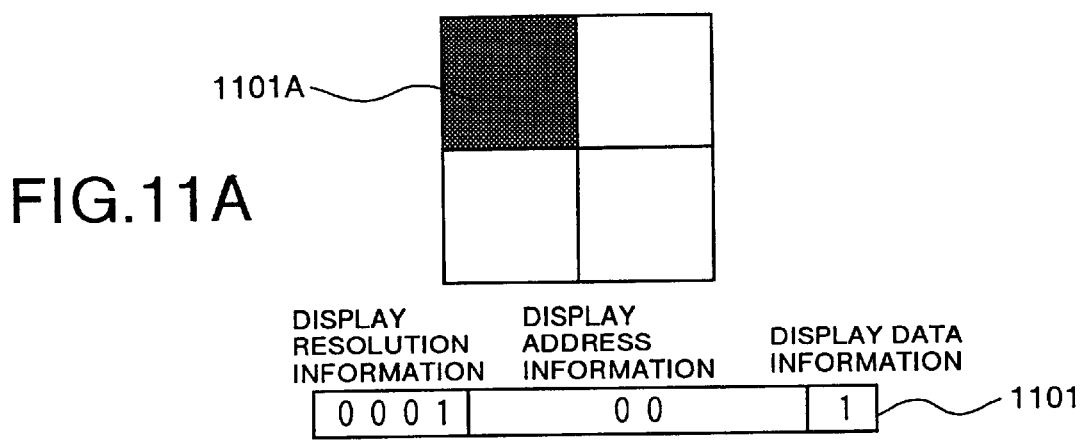
FIGS. 11A, 11B and 11C are explanatory views showing a first example in a case of converting an address to any other address through an operation.

At first, as shown in FIG. 11A, in split of addresses into four portions in LEVEL 1 (split of a side into two), the serial addresses "0" to "47" are split into two portions, so that, if a total number of display elements is 48, a number of display elements in each split unit is 24 which is half of the total number. The serial address of the 24th display element is "23" (because the serial address of the header display element is "0"). Accordingly, the address "24" is a header of the virtual address "1" in LEVEL 1. Herein, the number "24" is termed as "a number of split units". So, a number obtained by adding the number of split units "24" to the header address "24" is an end of the address "1".

Accordingly, an area corresponding to the virtual address "1" can be obtained by operations of "a number of split units×address" and "a number of split units×(address+1)". For example, the area corresponding to the virtual address "1" in LEVEL 1 is in a range from 24 or more (24×1 (1 in a binary digit)=24) to less than 48 (24×(1+1)=48). In addition, an area corresponding to the virtual address "0" in LEVEL 1 is in a range from 0 or more (24×0=0) to less than 24 (24×(0+1)=24).

Figure 11B:
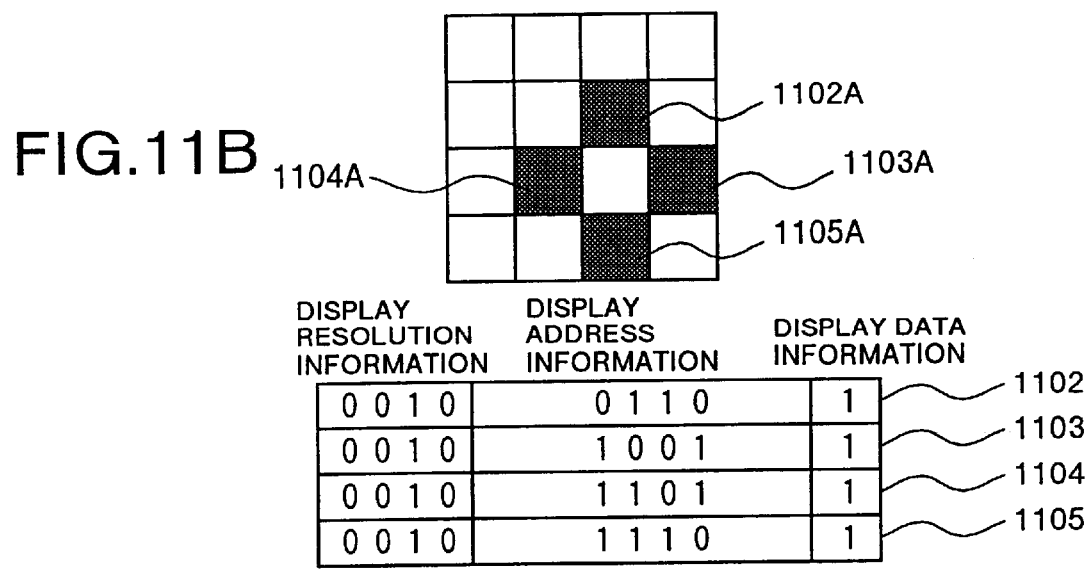
Figure 11C:
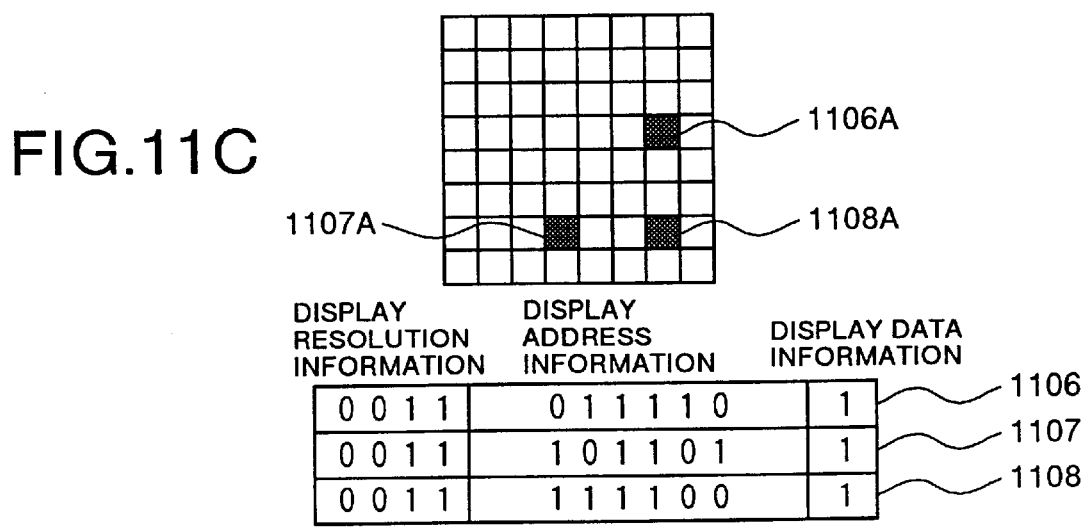

Then, as shown in FIG. 11B, in split of addresses into 16 portions in LEVEL 2 (split of a side into four portions), the serial addresses "0" to "47" are split into four portions, so that a number of display elements in the split unit is "12". The serial addresses "12" comes at a head of the virtual address "01" in LEVEL 2. So, a number obtained by adding the number of split units "12" to the header address "12" is an end of the address "01".

For this reason, an area corresponding to the virtual address "01" in LEVEL 2 is in a range from 12 or more (12×(01 in a binary digit)=12) to less than 24 (12×(1+1)= 24). In addition, an area corresponding to the virtual address "00" in LEVEL 2 is in a range from 0 or more (12×0 (00 in a binary digit)=0) to less than 12 (12×(0+1)=12). An area corresponding to the virtual address "10" is in a range from 24 or more (12×2 (10 in a binary digit) =24) to less than 36 (12×(2+1)=36), an area corresponding to the virtual address "11" is in a range from 36 or more (12×3 (11 in a binary digit)=36) to less than 48 (12×(3+1)=48). The same operation can be performed also to obtain an area corresponding to the case of splitting addresses into 64 in LEVEL 3.

(3) Address conversion by computing (Part 2)

Description is made herein for two cases; one in which a number of display elements along one side of a display unit 101R is a power of two, and another in which a number of display elements along one side of a display unit 101R is not a power of two.

Figure 12:
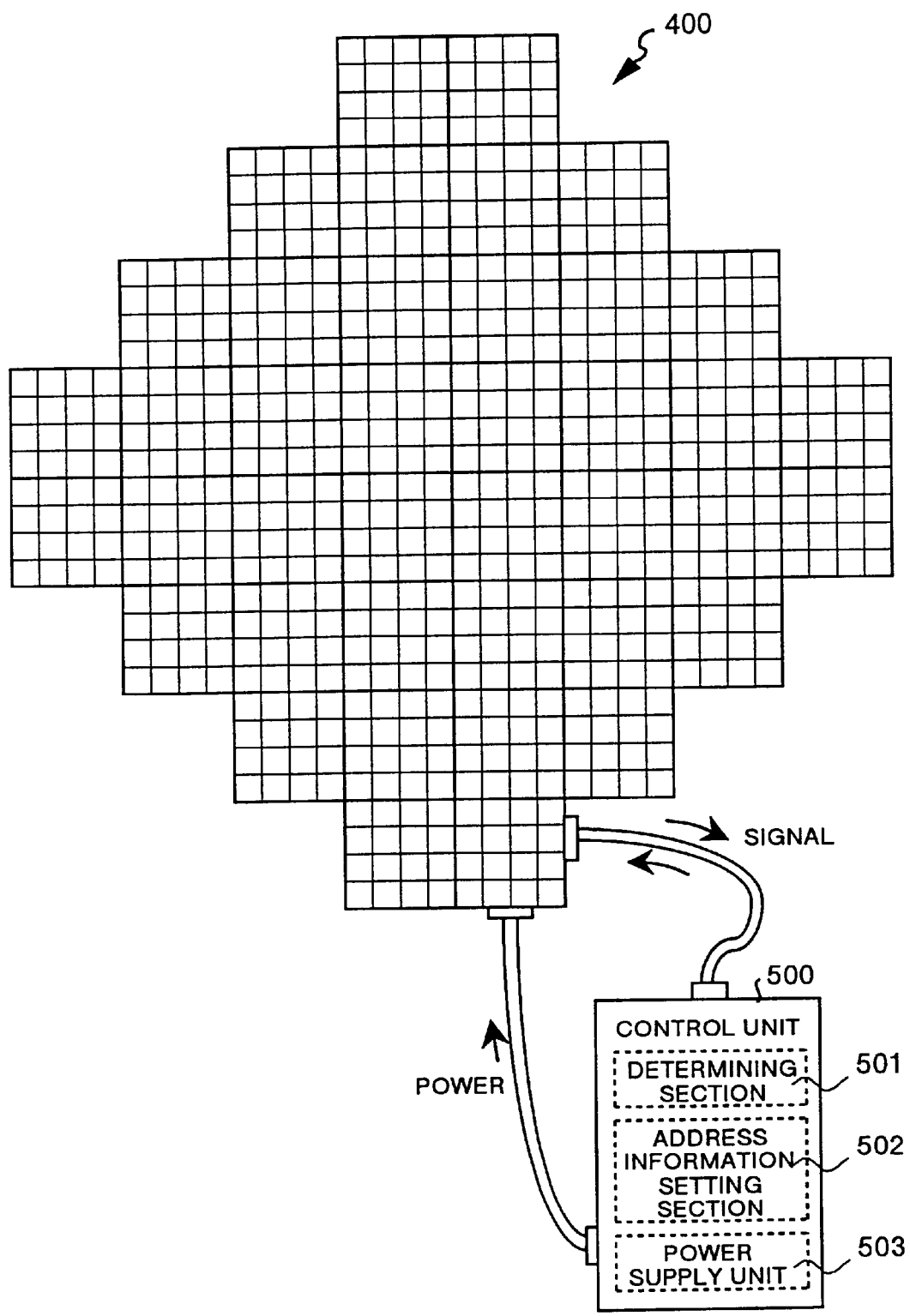
FIG. 12 is an explanatory view showing a second example in a case of converting an address to any other address through an operation and when a number of display elements on one side of a display unit is a power of two.
Figure 13A:
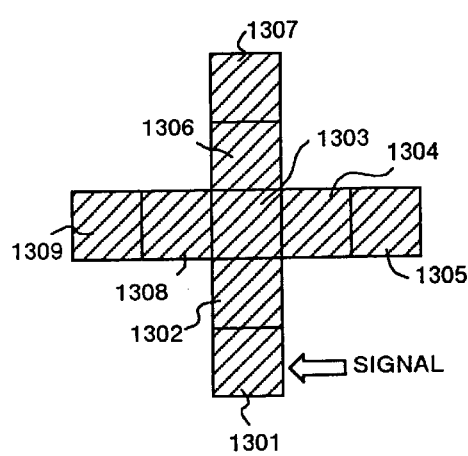
FIG. 13 is an explanatory view showing areas corresponding to virtual addresses.
Figure 13B:
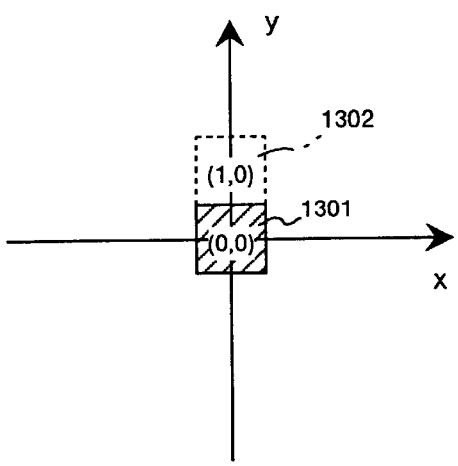
Figure 13C:
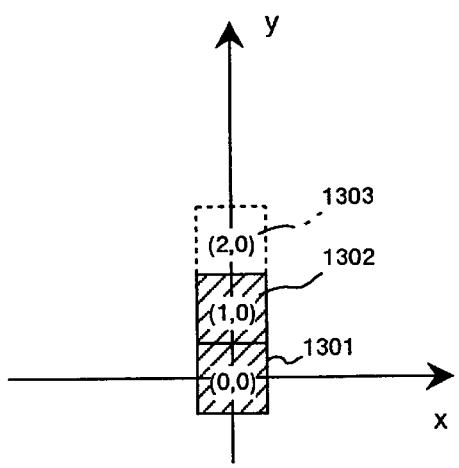
Figure 13D:
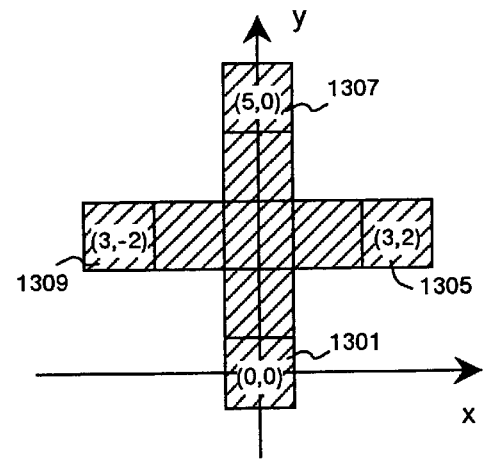

(a) Case where a number of display elements along one edge thereof is a power of two In this method, addresses are not set according to a total number of display elements along one side of the screen display section 150, but they are set according to a number of display units 101R therein. As shown in FIG. 12, five pieces of display units 101R are connected to one of the edges of the screen display section 150, and display element addresses "000", "001"..."100" are allocated to each of the display elements. A number of display elements in the display unit 101R is sixteen along one side, and internal addresses are allocated to the display elements as shown in FIG. 13.

At first, to which area of the display element addresses a virtual address indicated by the virtual address "110" in LEVEL 3 corresponds is determined. When addresses are split into eight portions in LEVEL 3, a split unit of a virtual unit 101V is expressed as follows:

101÷2÷2÷2=000.101

As the address of this split unit is "000. 101", a header of the virtual unit 101V indicated by the address "110" is expressed as follows:

000.101×110=011.1100

An end thereof is expressed as follows:

000.101×111 (110+1)=100.0110

From the operations described above, an area corresponding to the virtual unit 101V with the virtual address of "110" will be in a range from 011.1100 or more to less than 100.0110.

Specifically, section W shown in FIG. 13 and FIG. 12 corresponds to the virtual address "110". It is clear from a result of operations obtained as described above that the real number part of an address indicates an address of a display unit 101R and the decimal part thereof indicates an internal address within the display element. Accordingly, the same sequence may be performed also for the case where an area corresponding to an address other than "110" is to be obtained.

A corresponding area can be obtained in the same manner as described above even when the levels are different. For example, when addresses are split into four portions in LEVEL 2, a split unit for a left side of a virtual unit is expressed as follows:

101÷2÷2=001.01

For example, to which area of the display element addresses a virtual address indicated by the address "10" in LEVEL 1 corresponds is determined. As the address of the split unit is "1001.01", a header of the virtual unit indicated by the address "10" is expressed as follows:

001.01×10=010.10

An end thereof is expressed as follows:

001.01×11 (10+1)=011.11

From the operations described above, an area corresponding to a virtual unit with the virtual address of "10" will be in a range from 010.10 or more to less than 011.11.

According to this computing method, the real number part of an address can be indicated as a display element address of a display unit 101R and the decimal part thereof can be indicated as split information of the display unit 101R. Namely, in the example of LEVEL 3, the real part "100" of the address "100.011" indicates a display element address of a display unit 101R. The decimal part "0.011" indicates LEVEL 3 (16 splits) because of three digits. The two-digit decimal part indicates LEVEL 2 (four splits). The decimal part "0.0110" indicates, as shown in FIG. 13, an internal address within a display unit 101R.

(b) Case where a number of display elements in the split unit is not a power of two If a number of display elements along one side of a display unit 101R is not a power of two, the number of pieces may not finally be divided by 2. For example, if a number of display elements along one side of a screen display section is 48, at the point of time when an operation for two portions is repeated four times, a number of remaining display elements will be three, which can not be divided by 2. For this reason, even if serial addresses are allocated to each of the display elements as described above and the serial addresses are used, a corresponding area (W) can not directly be specified. Therefore, when a number of display elements is not a power of two, the display elements are subjected to the same processing as that in the case of virtually splitting a display unit.

Description is made for the above case with reference to an example. Consideration is made for a case where three display units 101R are connected and a number of display elements 102 along one side of each of the display units 101R is nine. In a case of nine display units along is one side, the total number is not a power of two, and therefore can not be divided by 2. For example, when one side is split into four portions (LEVEL 2), the split unit is expressed as follows:

11÷2÷2=0.11

As this split unit is "0.11", a header of the virtual unit 101V indicated by the virtual address "10" is expressed as follows:

0.11×10=01.10

An end thereof is expressed as follows:

$$0.11 \times 11\ (10+1) = 10.01$$

From the operations described above, an area corresponding to the virtual unit 101V with the virtual address of "10" will be in a range from 01.10 or more to less than 10.01.

Here, the decimal part of an address is considered. The expression described above has a two-digit decimal part. Number of display elements 102 is nine, so that internal addresses of the display elements 102 in the display unit 101R are "0000", "0001", "0010", "0011", "0100", "0101", "0110", "0111" and "1000". At first, a header of the virtual unit 101V indicated by the virtual address "10" is obtained. As the decimal part thereof has two digits, the virtual unit 101V is split into four, and the split unit is expressed as follows:

$$1001 \div 2 \div 2 = 10.01$$

An address of the header is "01.10", and the decimal part thereof is "10". Accordingly, a corresponding internal address is expressed as follows:

$$10.01 \times 10 = 100.1$$

Figure 14:
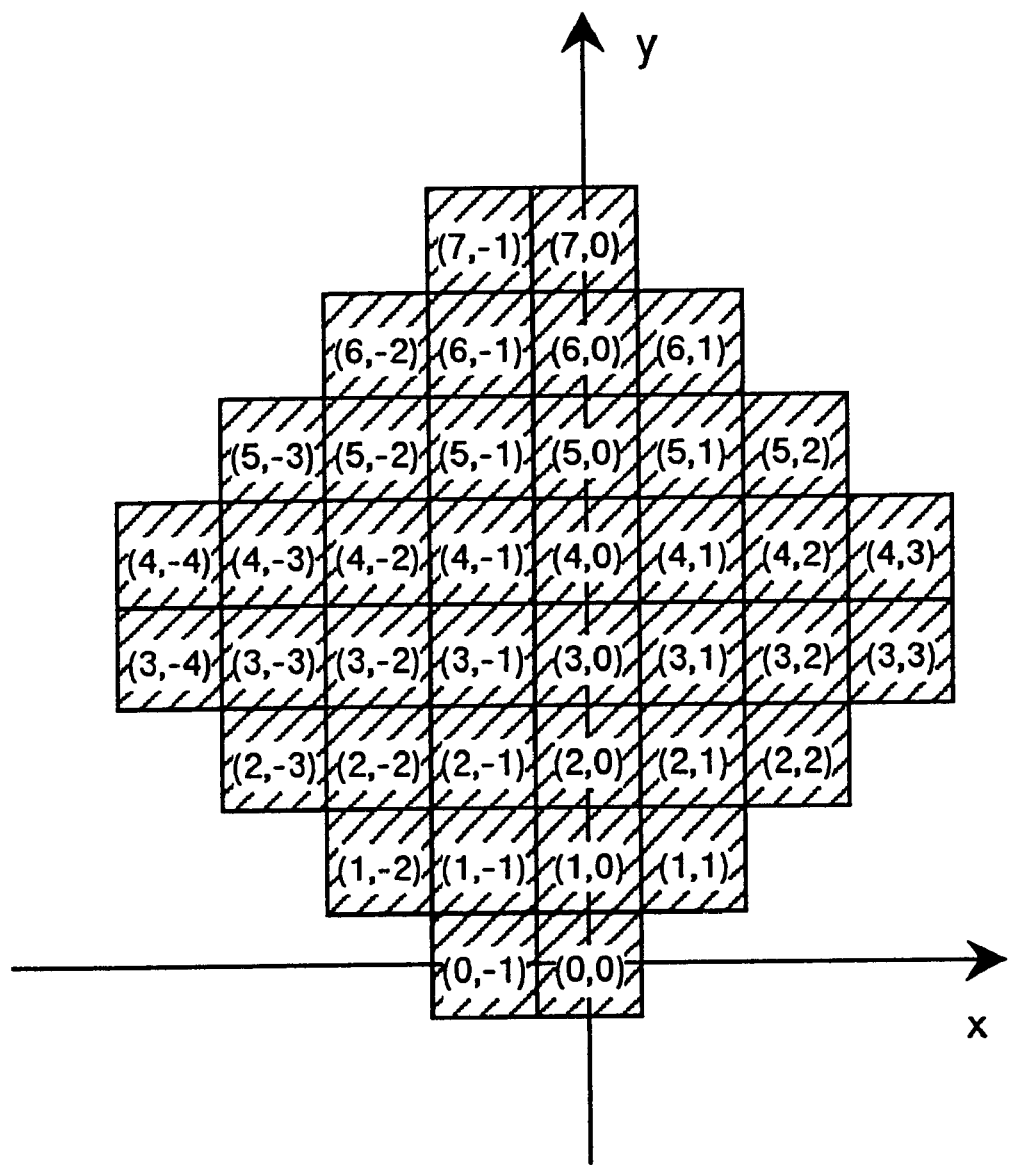
FIGS. 14A and 14B are explanatory views showing the second example in a case of converting an address to any other address through an operation and when a number of display elements on one side of a display unit is not a power of two.

Namely, as shown in FIG. 14B, the header of the virtual unit 101V indicated by the address "10" is the internal address "0100" in the display unit 101R with the display element address "01".

Then, an end of the virtual unit 101V indicated by the virtual address "10", in other word, a header of the virtual unit 101V indicated by the virtual address "11" is obtained. Similarly, the split unit is expressed with 10.01. Then, the address of the end thereof is "10.01", and the decimal part thereof is "01". Accordingly, a corresponding internal address is expressed as follows:

$$10.01 \times 01 = 10.01$$

Namely, as shown in FIG. 14B, the end of the virtual unit 101V indicated by the virtual address "10" is the internal address "0010" in the display unit 101R with the display element address "10". As described above, by executing the processing having been executed to the display unit to the display elements, a corresponding area W can be identified. It should be noted that the processing method described above is applicable not only to the case where a number of display elements along one side of a display unit 101R is nine but to the case where the number is not a power of two.

(4) Address conversion by computing and with table

Figure 15A:
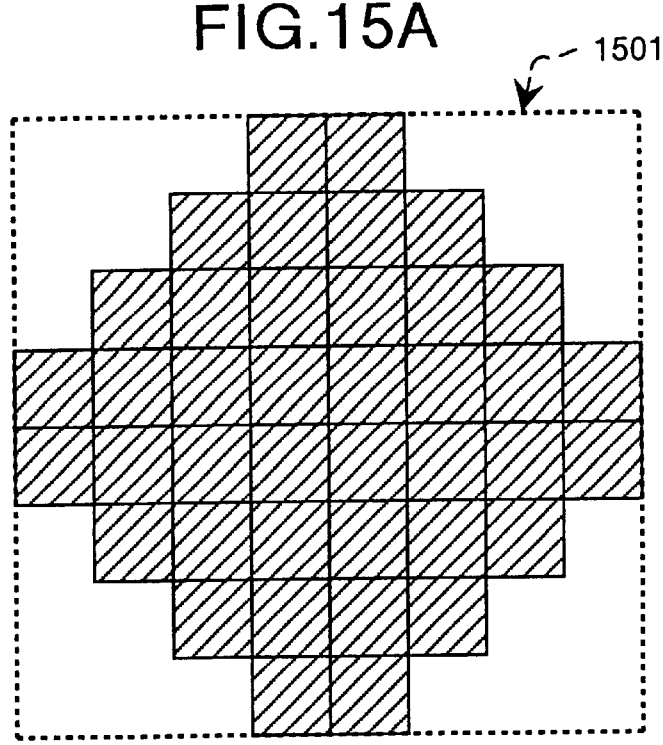
FIGS. 15A and 15B are explanatory views showing a third example in a case of converting an address to any other address through an operation.

Next, description is made for a case where the screen display section 150 is constructed by connecting three of display units each having sixteen display elements along one side as shown in FIG. 15A. Allocated to the display unit 101R are the display unit addresses "00", "01" and "10" for each unit. Further, internal addresses "0000", "0001", "0010", . . . "1111" are allocated to the display elements in each display unit respectively.

Herein, a display element with the internal; address of "1000" in the display unit 101R having the unit display address of "01" is taken up as an example, and conversion to a virtual address is executed. At first, the display unit address of this display unit 101R is "01" and the internal address of the display unit 101R is "1000", so that an address to be obtained is expressed by "011000". This address "011000" indicates a center of the display unit 101R (To describe more accurately, it indicates a display element at a right side from the centerline).

Also, in LEVEL 1 (split of one edge to 2 portions), assuming that a virtual address corresponding to the address "011000" is "X", a proportional equation is formulated as follows:

$$011000:3 = X:2$$

The virtual address "X" in Level 1 is computed from the proportional equation and obtained as follows:

$$\text{Address "X"} = 011000 \times 10 \div 11 = 010000$$

Figure 15B:
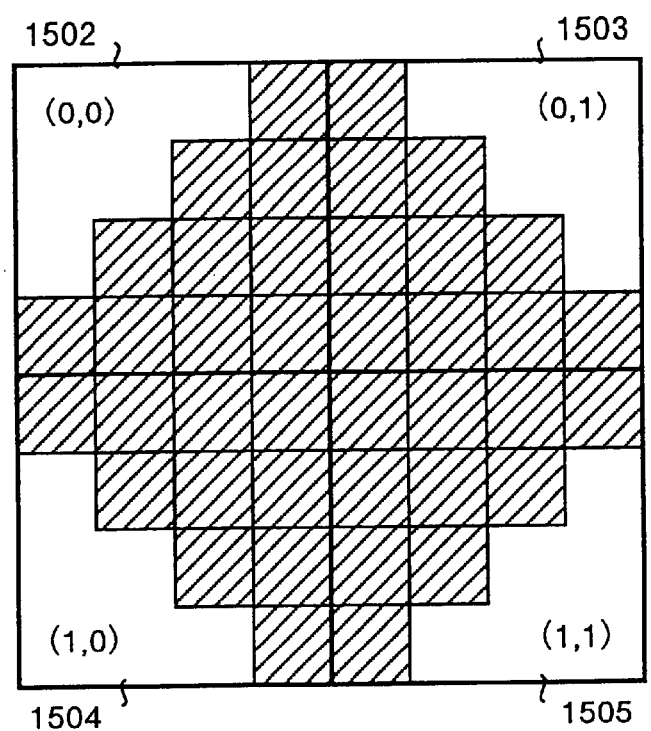

The virtual address "010000" obtained as described above indicates, as shown in FIG. 15B, a center of the virtual unit 101V (accurately, indicates a display element at a right side from the centerline). Namely, this virtual address "010000" indicates that the virtual unit address of the virtual unit 101V is "01" and the internal address thereof is "0000". The above result means that conversion of the address to the virtual address has appropriately been performed through the proportional equation.

The conversion based on the proportional equation can be applied in each level. In addition, the operations described above may be executed each time an instruction is issued, and the conversion may be performed by preparing a table with virtual addresses allocated to each display element. In this case, virtual addresses for each level are allocated to each display element.

Setting of Addresses

After the screen is split by applying the splitting method described above, a virtual address is set for each split unit, namely for each virtual unit. Description is made herein for the operations with reference to a concrete example. Each of the controllers 103 sets address information for each of display elements under controls by the unit itself on the screen in a way shown in FIG. 16A to FIG. 16D.

Figure 16A:
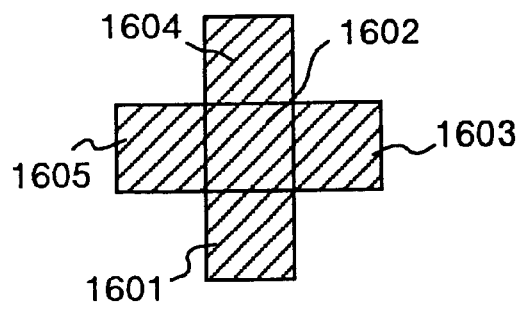
FIGS. 16 to 16D are explanatory views showing each processing of setting addresses.

FIG. 16A shows an entire screen obtained by connecting a plurality of display units 101 to each other, and shows a state in which the entire screen is recognized as one area (in other words, one pixel). In this case, a number of times of splitting the screen (has the same meaning as the "level") is "0", display resolution (in other words, a number of areas: resolution) is "1", and a number of bits required for an address to specify this area is "0" (namely, because of a unique area). It is not necessary that the number of display units 101 on its side is a power of two. That is because virtual units are prepared as described above and splits are repeated.

Figure 16B:
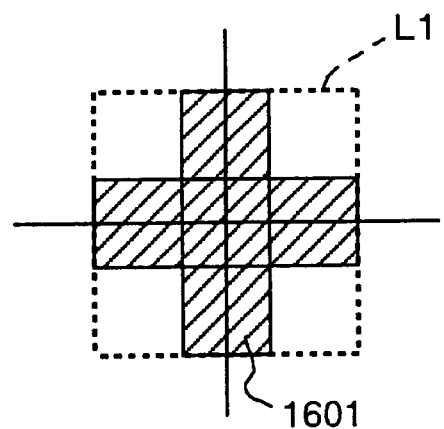

When address information is to be set, at first, the screen in FIG. 16A is split into four portions as shown in FIG. 16B, and 2-bit first virtual addresses such as "00", "01", "10" and "11" are allocated to positions in correlation to the split screens (areas a to d) respectively. In this case, a number of times of splitting the screen is "1", display resolution (in other words, a number of areas) is "4", and a number of bits required for an address to specify this area is "2".

Figure 16C:
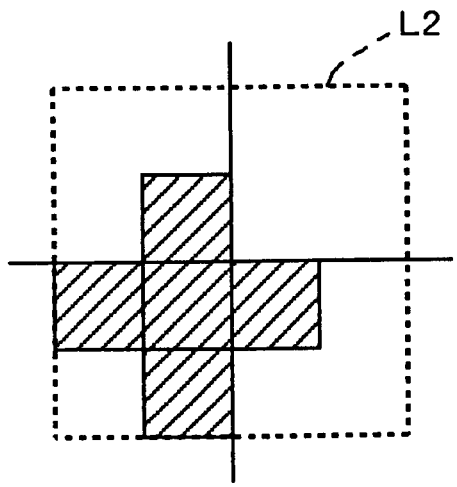

Then, the ¼ screen (areas a to d) specified by the first virtual address is further split into four portions, and 2-bit second virtual addresses such as "00", "01", "10" and "11" are allocated to positions in correlation to the split screens respectively. For example, when the area a is further split into four portions and the second virtual addresses are allocated to the four-split areas, as shown in FIG. 16C, the area e can be identified with the address "0000" by using the first virtual address and second virtual address, the area f can be identified with the address "0001", the area g can be identified with the address "0010", and the area h can be identified with the address "0011". In this case, a number of times of splitting the screen is "2", display resolution (in other words, a number of areas) is "16"and a number of bits required for an address to specify this area is "4".

Figure 16D:
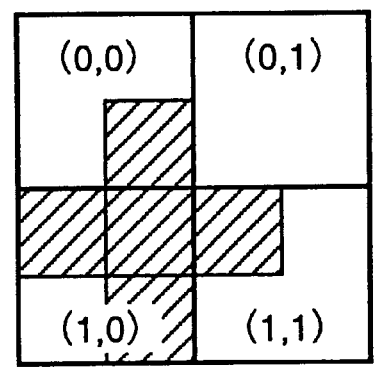

Then, as shown in FIG. 16D, the ⅛ screen specified by the second virtual address is further split into four portions, and 2-bit third virtual addresses such as "00", "01", "10" and "11" are allocated to positions in correlation to the split screens respectively. For example, the ¹⁄₁₆ screen indicated by the area i can be identified with the address "010101". In this case, a number of times of splitting the screen is "3", display resolution (in other words, a number of areas) is "64", and a number of bits required for an address to specify this area is "6".

Thereafter and on, by executing the processing of splitting the screen n-times until a number of display elements 102 within the split screen (namely, an area) is one piece and allocating the n-th virtual address thereto, address information for each of the display elements 102 is set with a bit array in which the virtual addresses are finally arranged in the order from the first to the n-th. By setting the address information as described above, even if the screen is constructed by connecting an arbitrary number of display units 101, a position of each display element 102 (address information) can be identified.

Stored in the memory 104 of each of the display units 101 constituting the screen is address information for each of the display elements 102 as a bit array in which the virtual addresses are arranged in the order from the first to the n-th each set according to a number of splits from the entire screen. Therefore, by specifying a range of virtual addresses to be used from the first to any order of the addresses, the display system 100 can be used as a screen having the display resolution correlated to a number of split times for any specified order of virtual addresses. In other words, the display system 100 can be used for an arbitrary resolution based on the display resolution at the time of using up to the n-th virtual address set as the maximum resolution.

It should be noted that the processing of setting the address information can be carried out each time when power is turned ON, but basically, the same address information can be used unless the size of the screen is changed or display elements are replaced.

Data Structure of a Display Signal

Figure 17:
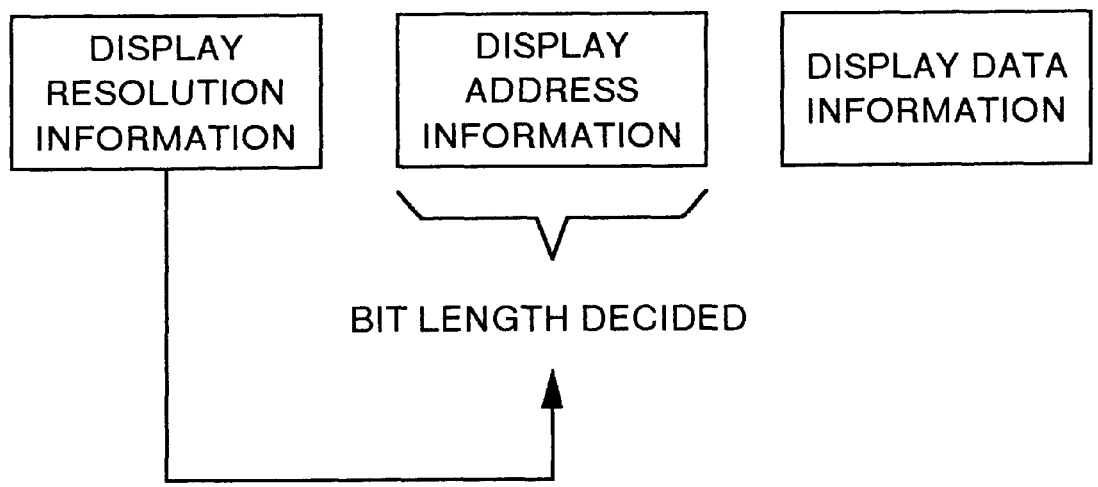
FIG. 17 is an explanatory view showing a data structure of a display signal.

Description is made for a data structure of a display signal outputted from the control unit 300 with reference to FIG. 17 and FIG. 18. The address information is set in the display system 100 as a bit array in which the virtual addresses are arranged in the order from the first to the n-th set according to a number of splits from the entire screen, so that, by specifying a range of virtual addresses to be used from the first to any order of the addresses, the display system 100 can be used as a screen having the display resolution correlated to a number of split times for any specified order of virtual addresses. In other words, the display system 100 can be used for an arbitrary resolution based on the display resolution at the time of using up to the n-th virtual address set as the maximum resolution.

Accordingly, the display signal has a structure comprising, as shown in FIG. 17, display resolution information for specifying display resolution, display address information for identifying a display element and display data information for indicating display contents of the display element identified with the display address information. As clearly understood from the data structure, the display signal consists of display resolution information, destination address information identified with display address information and display data information as a command to the destination, so that display data corresponding to a target display element 102 as the destination address can be transferred thereto without fail even if the data is transmitted through an arbitrary route based on packet communications.

The display resolution to be specified with the display resolution information is correlated to a number of split times as described above, and a range of virtual addresses up to any order thereof (in other words, a bit length to be used in address information) can be decided depending on a number of split times. FIG. 18 shows a correlation between a number of split times, display resolution information, a bit length of display address information and display resolution. Four-bit display resolution information can support as far as display address information with a bit length of 30 bits (15th virtual address). The display resolution at this time is 1G (giga), which is sufficiently capable of fulfilling demands for currently conceivable high resolution.

Processing of Displaying Image Data in Display System

Figure 19A:
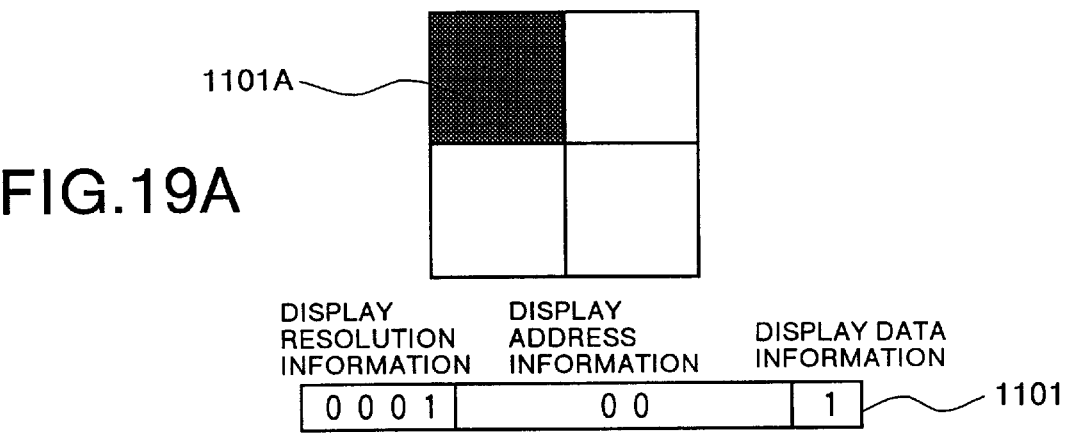
FIGS. 19A to 19C are explanatory views showing each processing of displaying image data in the display system.
Figure 19B:
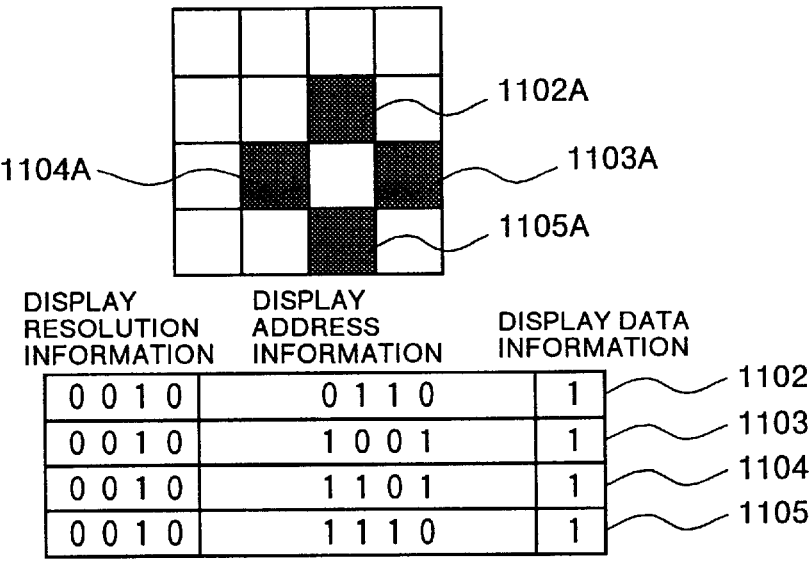
Figure 19C:
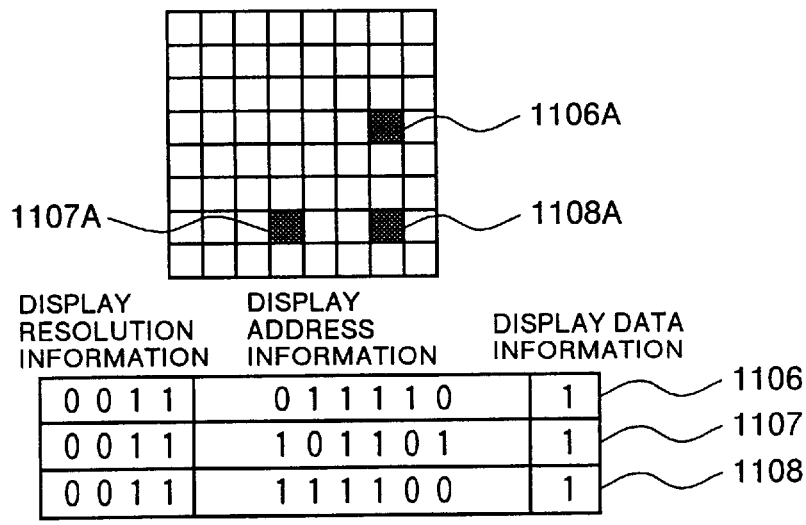
Figure 20:
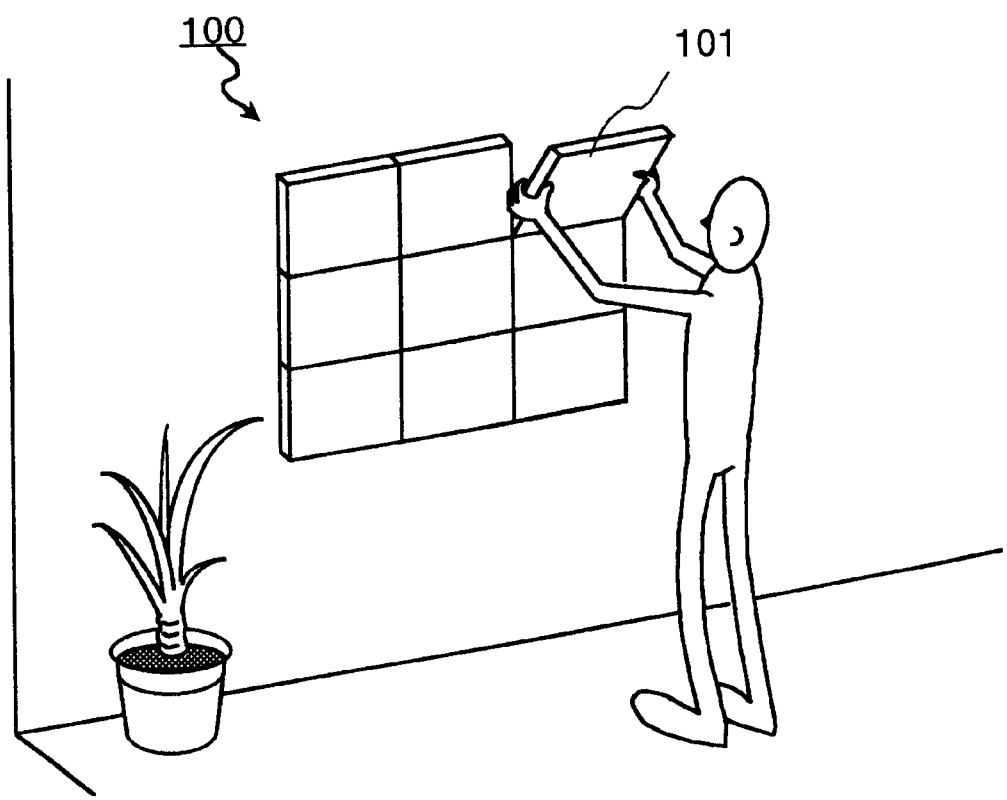
FIG. 20 is a perspective explanatory view showing the display system applied for by the present applicant.
Figure 21:
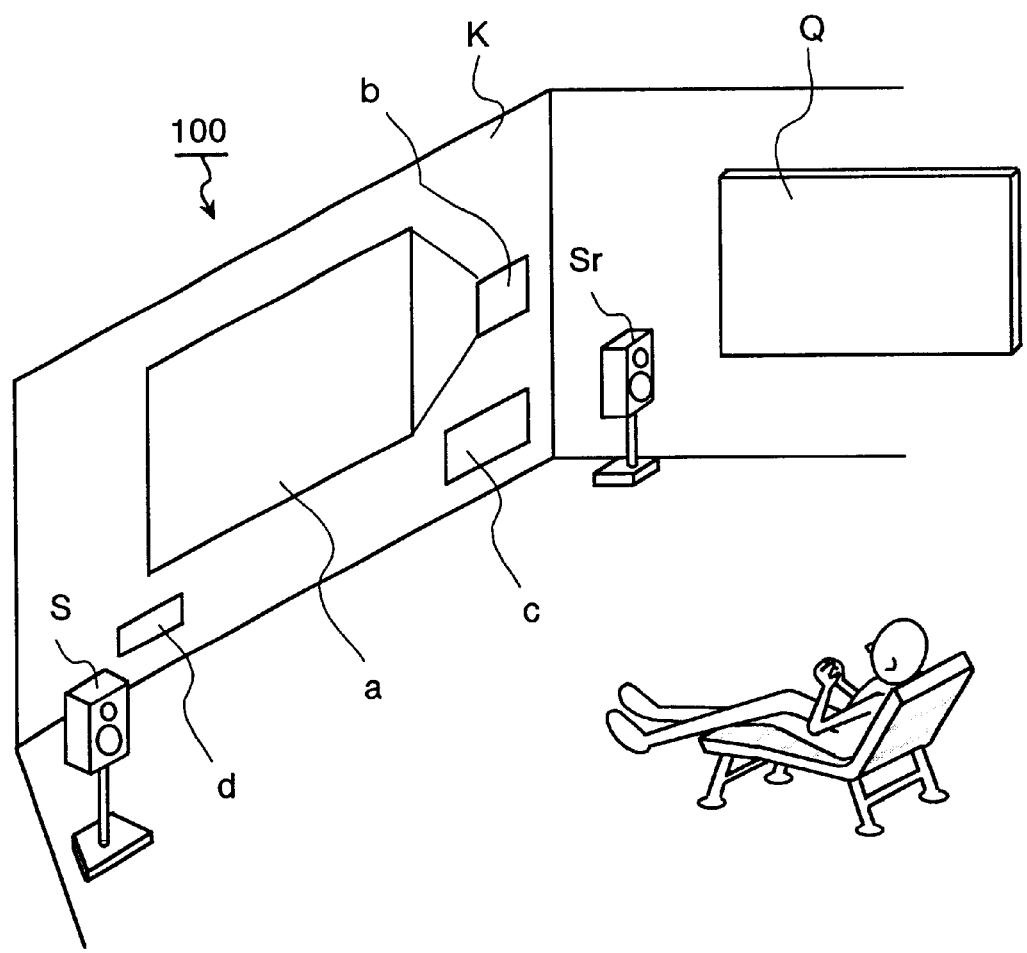
FIG. 21 is an explanatory view showing the use of display system shown in FIG. 20.
Figure 22:
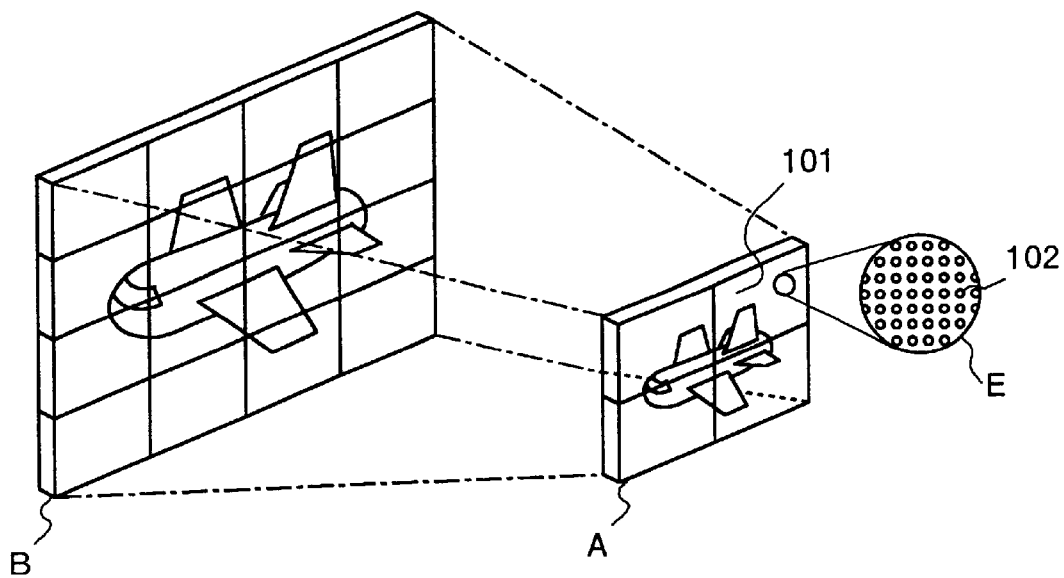
FIG. 22 is an explanatory view related to magnification of the screen and a construction of the display elements.
Figure 25:
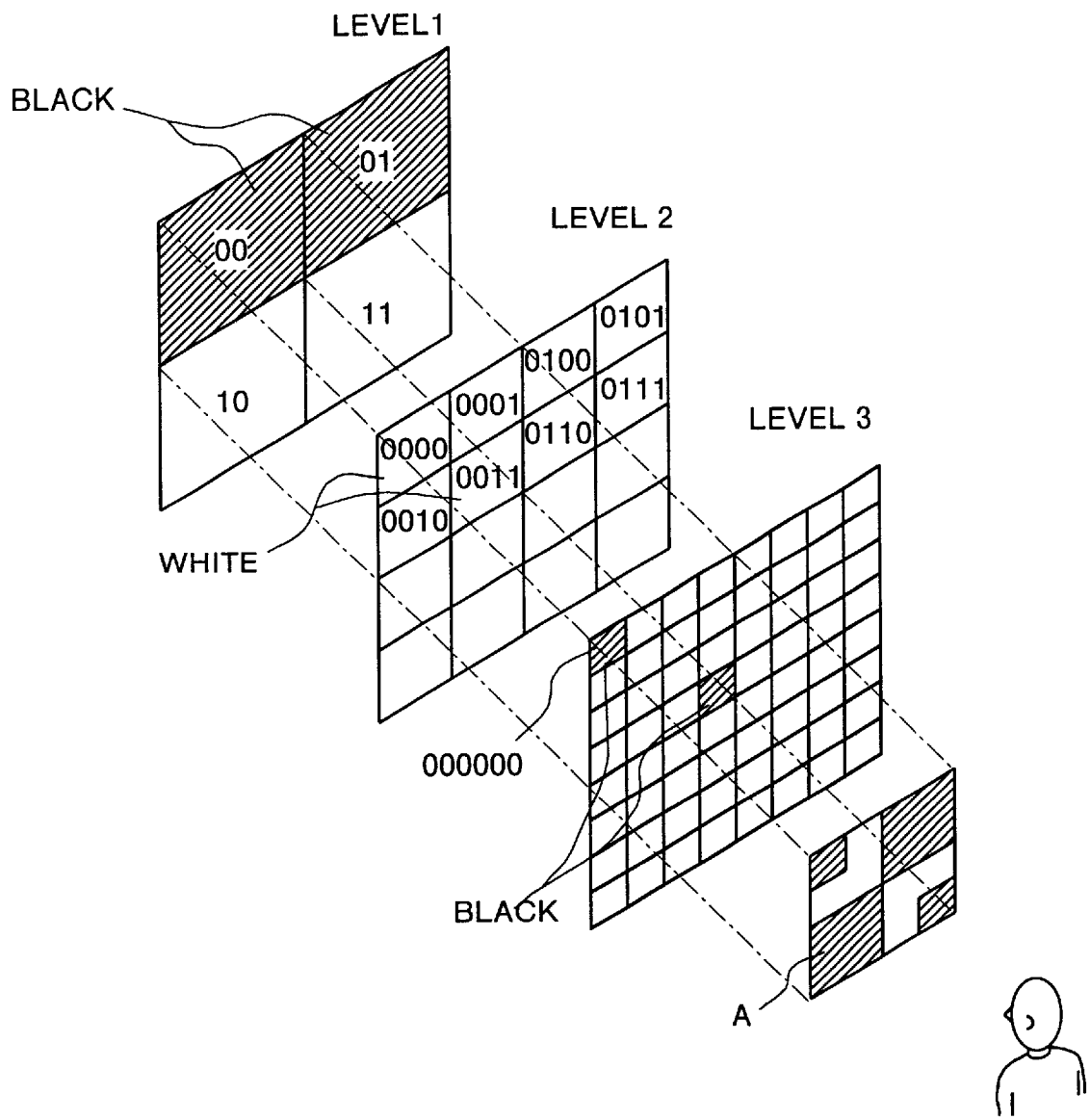
FIG. 25 is an explanatory view showing a display method of an image based on the display system.
Figure 26A:
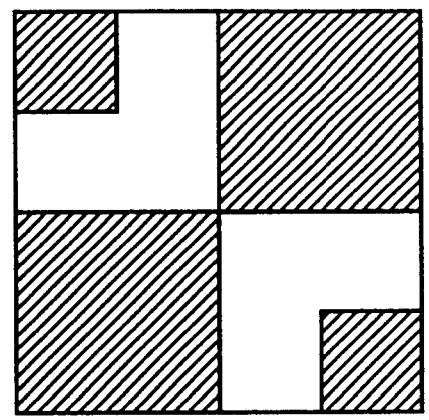
FIGS. 26A and 26B are explanatory views each showing an example of display an image.
Figure 26B:
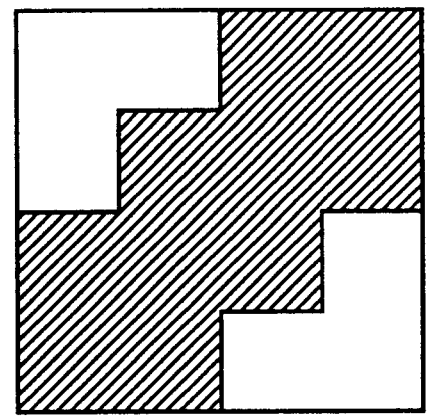
Figure 27A:
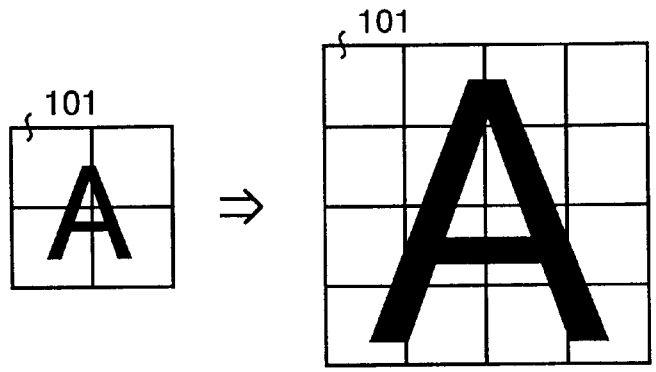
FIGS. 27A and 27B are explanatory views showing examples of display images each depending on a different number of display elements.
Figure 27B:
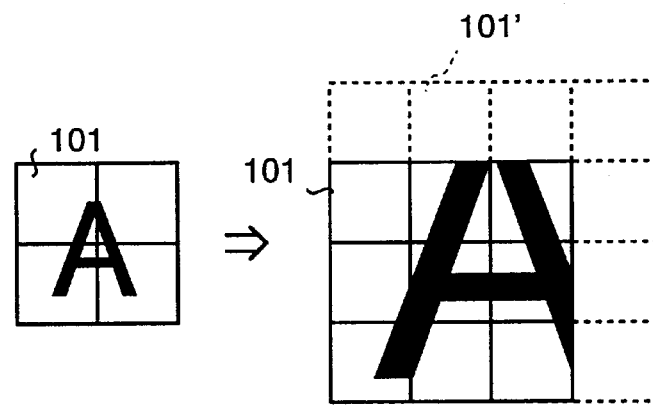

Description is made for processing of displaying image data in the display system with reference to FIG. 19A to FIG. 19C. The display system 100 transmits, when having received a display signal (image data) from the control unit 300, the display signal to all the display units 101 constituting the screen through each signal transmitting section 105 of each of the display units 101.

While each of the controllers 103 determines, when having received the display signal, a bit length of the display address information with reference to the first 4 bits in the display signal (namely, display resolution information). Herein, assuming that the display signal 1101 shown in FIG. 19A is received, as it is clear from the display resolution information "0001" that a bit length of the display address information is 2 bits, the controller fetches "00" in the 5th bit and the 6th bit of the display signals as display address information, and determines whether any address information coincident with the display address information exists or not by referring to each upper 2 bits in the address information stored in the memory 104 of the unit itself. If it is determined that there is the coincident address information, the controller changes the state of displaying all the display elements having the corresponding address information according to the display data information at the 7th bit of the display signals. While, if it is determined that there is no coincident address information, the controller does not change the displayed state. Therefore, all the display elements 102 in the area 1101A having the address information "00" are turned ON according to the display data information "1". It should be noted that, the processing is explained considering only one color and ON/OFF control thereof to make the description simple, but it is needless to say that in practice color display is performed by discretely controlling ON or OFF of and controlling brightness adjustment to three light-emitting diodes R, G and B constituting the display element 102.

As shown in FIG. 19B, when the controller 103 receives display signals 1102 to 1105, as it is clear from the display resolution information "0010" that a bit length of the display address information is 4 bits, the controller fetches 4 bits from the 5th bit to the 8th bit of the display signals as display address information, and determines whether any address information coincident with the display address information exists or not by referring to each upper 4 bits in the address information stored in the memory 104 of the unit itself. If it is determined that there is the coincident address information, the controller changes the state of displaying all the display elements having the corresponding address information according to the display data information at the $9^{th}$ bit of the display signals. Therefore, all the display elements 102 in the area 1102A having the address information "0110" are turned ON according to the display data information "1". Similarly, all the display elements 102 in the area 1103A with the address information "1001", in the area 1104A with the address information "1101" and in the area 1105A with the address information "1110" are turned ON according to the display data information "1".

As shown in FIG. 19C, when the controller 103 receives display signals 1106 to 1108, as it is clear from the display resolution information "0011" that a bit length of the display address information is 6 bits, the controller fetches 6 bits from the 5th bit to the 10th bit of the display signals as display address information, and determines whether any address information coincident with the display address information exists or not by referring to each upper 6 bits in the address information stored in the memory 104 of the unit itself. If it is determined that there is the coincident address information, the controller changes the state of displaying all the display elements having the corresponding address information according to the display data information at the 11th bit of the display signals. As a result, all the display elements 102 in the area 1106A with the address information "011110", in the area 1107A with the address information "101101" and in the area 1108A with the address information "111100" are turned ON according to the display data information "1".

As described above, with this display system 100, the screen is split based on virtual units, so that an image is displayed without being trimmed of any part thereof. In addition, as it does not matter how many display units 101 are connected, a user can purchase a desired number of display units 101 to construct a screen freely of desired size. For this reason, a large screen with high resolution matching the size of a room can be realized. In addition, the display units 101 can be added as many as required. Further, the screen can appropriately be split regardless whether a number of display elements on one side of a display element is a power of two or not.

As described above, the display system according to the present invention comprises a display device obtained by constructing a screen with a plurality of display units each in turn comprising display elements arranged in a matrix connected to each other; and a control unit for virtually repeating an operation of splitting the screen into four portions by not necessarily setting the display unit as a unit for splitting but setting the display element as a minimum unit for splitting, setting a virtual address for each split unit each time when the screen is split into four portions, and identifying this virtual address, giving display data to be displayed to a virtual unit having the corresponding virtual address, and displaying an image on a part or all of the display unit, so that an image is displayed without being trimmed of any part thereof. In addition, size of a screen can freely be set without requiring a particular number of display elements.

With the display system according to the present invention, a control unit allocates serial addresses to display elements of each of the display units from an edge of the constructed screen; obtains a number of display elements for each split unit by dividing a total number of the display elements by a number of splits in a side of the screen; obtains, by comparing values obtained by successively multiplying the number of display elements by each value from "0" to "a number of splits −1" to particular serial addresses, virtual addresses corresponding to the serial addresses; makes virtual addresses correlated to the serial addresses to a table for each split level; and performs address conversion according to this table. For this reason, appropriate conversion can be performed from addresses in display units to virtual addresses. In addition, address conversion is executed with the table, which makes processing speed faster.

With the display system according to the present invention, the control unit allocates serial addresses to display elements of each of the display units from an edge of the constructed screen; obtains a number of display elements for each split unit by dividing a total number of the display elements by a number of splits in a side of the screen; and performs address conversion by multiplying the number of display elements by LEVEL. For this reason, appropriate conversion can be performed from addresses in display units to virtual addresses.

With the display system according to the present invention, the control unit allocates display unit addresses to display units from an edge thereof, and allocates internal addresses to display elements; obtains a number of display units for each split unit by dividing the number of display units by a number of splits in a side of the screen; multiplies the number of display units for each split unit by a virtual address to be obtained; and performs address conversion by identifying any of the display units according to a real part of the obtained address and identifying an internal address of any of display units in the display element according to a decimal part of the address. For this reason, appropriate conversion can be performed from addresses in display units to virtual addresses.

With the display system according to the present invention, the control unit obtains a number of display elements for each split unit by dividing a number of display elements by a number of splits in a side of the screen; and handles units of display elements by executing processing, when a fraction results in the number of display elements for each split unit, for the corresponding fraction. For this reason, appropriate conversion can be performed from addresses in display units to virtual addresses even if a number of display elements can not equally be divided.

With the display system according to the present invention, the control unit allocates display element addresses to display units from an edge thereof, and allocates internal addresses to display elements for each display element; and obtains virtual addresses from a proportional equation between a number of display units and a number of splits of virtual units. For this reason, appropriate conversion can be performed from addresses in display units to virtual addresses.

With the display system according to the present invention, the control unit allocates display unit addresses to display elements from an edge thereof, and allocates internal addresses to display elements for each display element; obtains virtual addresses from a proportional equation between a number of display units and a number of splits of virtual units; makes virtual addresses correlated to addresses specified from the display element addresses and internal addresses to a table for each split level; and performs address conversion according to this table. For this reason, appropriate conversion can be performed from addresses in display units to virtual addresses. In addition, address conversion is executed with the table, which makes processing speed faster.

This application is based on Japanese patent application No. HEI 9-290162 filed in the Japanese Patent Office on Oct. 22, 1997, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A display system comprising:
   a display device having a screen comprising a plurality of display units, each display unit having a plurality of display elements arranged in a matrix and said plurality of display units being connected to each other; and
   a control unit operative to virtually repeat at least the following:
   (1) splitting said screen into four by not necessarily setting said display unit as a unit for splitting but setting said display element as a minimum unit for splitting;
   (2) setting a virtual address for each split unit each time when said screen is split into four;
   (3) identifying this virtual address, giving display data to be displayed to a virtual unit having the corresponding virtual address; and
   (4) displaying an image on a part or all of said display unit.

2. A display system according to claim 1, wherein said control unit:
   (1) allocates serial addresses to display elements of each of the display units from an edge of said constructed screen;
   (2) obtains a number of display elements for each split unit by dividing a total number of the display elements by a number of splits in a side of the screen;
   (3) obtains, by comparing values obtained by successively multiplying the number of display elements by each value from "0" to "a number of splits –1" to particular serial addresses, virtual addresses corresponding to said serial addresses;
   (4) tabulates virtual addresses correlated to said serial addresses for each split level; and
   (5) performs address conversion according to said tabulation.

3. A display system according to claim 1, wherein said control unit allocates serial addresses to display elements of each of the display units from an edge of said constructed screen; obtains a number of display elements for each split unit by dividing a total number of the display elements by a number of splits in a side of the screen; and performs address conversion by multiplying the number of display elements by "n" where "n" represents the power to which 2 is raised as representative of the times a screen is split.

4. A display system according to claim 1, wherein said control unit allocates display unit addresses, comprising real and decimal parts, to display units from an edge thereof, and allocates internal addresses to display elements; obtains a number of display units for each split unit by dividing said number of display units by a number of splits in a side of the screen; multiplies the number of display units for each split unit by a virtual address to be obtained and performs address conversion by identifying any of said display units according to a real part of the obtained address and by identifying an internal address of any of display units in the display unit according to a decimal part of the address.

5. A display system according to claim 4, wherein said control unit is operative to obtain a number of display elements for each split unit by dividing a number of display elements by a number of splits in a side of the screen; and is operative to execute processing for virtually splitting the units according to the display elements, when a remainder results in the number of display elements for each split unit.

6. A display system according to claim 1, wherein said control unit allocates display unit addresses to display units from an edge thereof, allocates internal addresses to display elements for each display unit; and obtains virtual addresses from an equation representing a proportion between a number of display units and a number of splits of virtual units.

7. A display system according to claim 1, wherein said control unit allocates display unit addresses to display units form an edge thereof, and allocates internal addresses to display elements for each display unit; obtains virtual addresses from an equation representing a proportion between a number of display units and a number of splits of virtual units; tabulates virtual addresses correlated to addresses specified form said display unit addresses and internal addresses of reach split level; and performs address conversion according to said tabulation.

* * * * *